(12) United States Patent
Satzler et al.

(10) Patent No.: US 8,626,408 B1
(45) Date of Patent: Jan. 7, 2014

(54) ROW-PRODUCING SYSTEM FOR AGRICULTURAL CROPS

(71) Applicants: Ronald L. Satzler, Princeville, IL (US); David C. Janzen, Metamora, IL (US)

(72) Inventors: Ronald L. Satzler, Princeville, IL (US); David C. Janzen, Metamora, IL (US)

( * ) Notice: Subject to any disclaimer, the term of this patent is extended or adjusted under 35 U.S.C. 154(b) by 0 days.

(21) Appl. No.: 13/888,111

(22) Filed: May 6, 2013

(51) Int. Cl.
*A01C 7/18* (2006.01)

(52) U.S. Cl.
USPC .................. 701/50; 111/200; 111/18; 111/52

(58) Field of Classification Search
USPC ........ 701/50; 111/200, 14, 18, 20, 22, 52, 59, 111/69, 926, 927
See application file for complete search history.

(56) References Cited

U.S. PATENT DOCUMENTS

2009/0266279 A1* 10/2009 Dillman ........................ 111/200

* cited by examiner

*Primary Examiner* — Christopher J Novosad

(57) ABSTRACT

An integrated system for row-producing in agriculture fields comprises several implements each having an elevated central frame, an undercarriage assembly with a rear active steering system and the undercarriage assembly is rear located and being behind the structures of toolbar and row units. The rear active steering system controlled by a GPS system comprises a steer angle sensor and a closed loop continuous feedback system, with the purpose of keeping a precise lateral location. This integrated system also comprises an active toolbar height controlling system. When needed, the undercarriage assembly can be disconnected from the implement. This integrated system functions to reduce compactions in the field and ensure lateral accuracy of the implement movement. The integrated system works as a strip tiller, and as a planter.

13 Claims, 27 Drawing Sheets

ROW-PRODUCING SYSTEM FOR AGRICULTURAL CROPS

FIELD OF THE INVENTION

The present invention relates generally to a two-step, integrated system that can function as two unique, component-sharing implements for row-producing and seed planting. More specifically, it relates to an integrated system for constructing rows and planting seeds in agriculture. It improves the desirability and advantages of the broadly defined farming practice of strip tilling.

BACKGROUND OF THE INVENTION

Current available implements for preparing row environments and placing agricultural seeds in that row environment have seen an undesirable trend of growing in weight. This increase in weight is due generally to having the ability to do more rows during a pass through the field. Also, the total volume of the containers for seed, fertilizer, chemicals, etc has increased thus adding the weight that must be carried. These factors have required that the central frame structure, the undercarriage structure, and the tool bar structure also be heavier than the older, smaller implements used to prepare and plant rows.

The current row-producing implements also have performance related features that add weight and complexity to the row-producing operation. These features include row meter drive systems that can control dispense rates independently for individual rows or for groups of rows. Other systems that add weight include means of actively controlling down force on individual row units, more elaborate sensor systems that monitor and optimize the performance of the row implement, and other added features.

In addition, the current commonly used large row-producing implements may also have secondary systems for folding the implement to widths that are practical for transporting on public roads and secondary systems that allow the tool bar to flex sufficiently to follow uneven ground contours. These systems also contribute to the total weight of the row-producing implement.

The undercarriage of current row-producing implements limits some of the options for row spacing because parts of the undercarriage mechanism take up space between some of the row units. Moving the undercarriage to the rear improves options including: 1. Optimizing row unit designs; 2. Optimizing row spacing; and 3. Optimizing undercarriage designs.

Furthermore, the similar agriculture implements currently available on the market lack a few very beneficial features, including: 1) a user-friendly means of constructing a strip of ideal seed bed for the seed; 2) a cost-effective means for constructing a strip of ideal seed bed for the seed; 3) a user-friendly means of placing the seed laterally centered on the strip of ideal seed bed; and 4) the implement components shared in both seed bed construction and seed placement. An ideal seedbed would be affected by implements. The ideal seedbed primarily has these features. It has minimal compaction for the expanding roots to encounter. Plants sprout at the same time and develop uniformly, both below ground and above ground. Plant food placed in the most desirable locations. It should also have an excellent water infiltration deep into the soil where roots can find it in a hot dry weather period while minimizing water runoff from the field during rain events or between irrigation cycles.

The high cost of energy, the need to better control erosion, and the advent of herbicides that effectively control weeds has encourage the practice of what is generally referred to as strip tilling. Strip-till is a conservation practice that uses a minimum tillage. It combines the soil drying and warming benefits of conventional tillage with the soil-protecting advantages of no-till by preparing only the portion of the soil that is to contain the seed row. Another benefit of strip-tilling is that the farmer can apply chemicals and fertilizer at the same time as tillage. A narrow, tilled strip is intended to become the row containing materials that include fertilizer, seed, insecticide, and eventually the growing plant. It is currently difficult to precisely follow the tilled strip's location with subsequent operations such as seed placement. With min-tillage practice, it leaves previous crop residue in place to avoid or greatly reduce soil erosion from water and wind. A significant problem is that covered soil does not warm up or dry up soon enough to plant a crop for maximum economic yield. The proposed invention provides a very user friendly means to provide narrow strips of bare soil that provide a highly favorable seed bed that any low skilled hired operator can achieve.

The high cost of implements makes it desirable to have multi-purpose implements or implements that share components. The present invention allows for components, for example the undercarriage arrangement, an expensive and functionally desirable portion of the implement, to be used for multiple operations. The multi-purpose undercarriage component has desirable characteristics includes keeping compaction low, having good mobility, not producing ruts, being able to steer, and being able to simultaneously carry high loads.

Other components that may have multi-purpose uses include, but not limited to, material containers, material distribution components, depth control components, guidance control components, computers, software, and frame structure.

The present invention is an integrated system comprising a new and unique combination of both state of the art components to make it easy to precisely follow the narrow strip-tilled path with subsequent row-producing operations.

The present invention requires the use of two additional control systems not found on conventional row-producing agricultural implements.
1. An active toolbar height control system similar to header height control systems on combines.
2. An active steering system for the undercarriage.

BRIEF SUMMARY OF THE INVENTION

The present invention includes a combination of state of the art components and new, unique components that form a row producing system that is superior to the current row producing implements and methods. Each component of the combination is generally understood by those skilled in the art. Components include a combination of mechanical mechanisms, hydraulic mechanisms, corresponding controls, GPS guidance, and the unique arrangement of components.

DETAILED DESCRIPTION OF THE INVENTION

Figure 1:
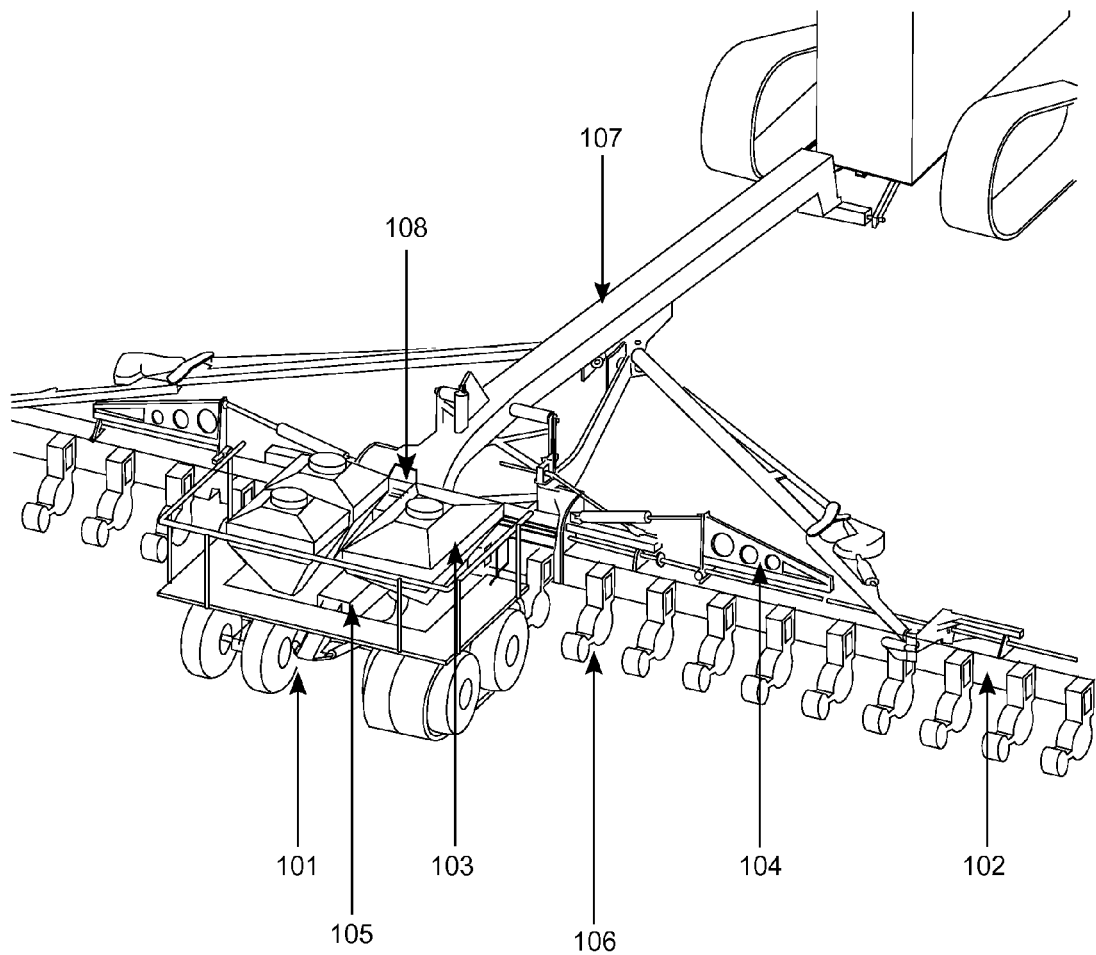
FIG. 1 is a rear perspective illustration of the preferred embodiment of the present invention.

All illustrations of the drawings are for the purpose of describing selected versions of the present invention and are not intended to limit the scope of the present invention.

The present invention is an integrated system that uses two row-producing agricultural implements. One of the primary aims of the present invention is to improve the ease of producing and planting in strips. The seed planting implement of the invention also has many solutions for farmers who prefer complete field tillage before planting. These improvements include: 1) reduced compaction during the planting operation; 2) allows the use of larger containers of seed and fertilizer while controlling and reducing the compaction level; the mechanical row marker for the next pass is eliminated. The row marker does not work effectively in planting contours with wide planters; hence the well known term of "guess row"; and 4) the invention allows lower skilled, lower cost operators to achieve perfect planting results.

As being mentioned above, with many implements getting bigger and heavier, the compaction issue gradually becomes a serious problem. Compaction increases as the agriculture machinery gets heavier. There is a trend towards larger and heavier machinery and larger amounts of fertilizer, chemical, and seed carried on the machinery. Significant and negative effects of this increased compaction are being observed by those (including "professional farmers") skilled in the art.

This integrated system more effectively incorporates methods currently being tried to minimize compaction. Current methods include attempting to use more tires, larger tires, or to use tracks. Current row construction implement configurations have space constraints that tend to limit attempts to increase the number of tires, size of tires, or the size of tracks.

This integrated system in the present invention removes space constraints by positioning the tires or tracks completely behind the implement tool bar and row units. This position allows for more tires, or larger tires, or larger tracks. The net result is lower compaction.

This integrated system adds to the advantages of strip tilling. Current strip till implements tend to construct a strip that is both shallow and variable in depth. This leaves varying degrees of compacted soil that interfere with the downward growth of developing plant roots. Those skilled in the art understand that such compaction and root interference reduces crop yield.

If current strip till implements attempt to construct a uniformly deeper slot, in order to remove deep compaction within the strip, a few problems will be encountered. Compaction encountered by the strip till implement's ground engaging shanks will, almost always, be non-uniform laterally from left end to right end of the tool bar. This non-uniform compaction may be the result of previous wheel ruts, ditches, slopes, and soil type variations. Non-uniform compaction laterally causes non-uniform pull forces laterally side to side. This in turn causes the implement to experience lateral skid. When lateral skid happens, the implement is no longer following precisely in the intended and required path. Lateral skid to the left can quickly change to lateral skid to the right because the amount of compaction encountered can quickly change from the right side to the left side of the implement. Thus the constructed strip-till rows are crooked and nearly impossible to be precisely followed by seeding or other implements.

With current full tillage methods, the ripper slots in the ground are backfilled with tilled soil; each ripper shank creates a valley about 15 inches below ground; and the soil fractures at an angle creating a profile of peaks and valleys. So, above the profile, the soil is tilled. Below the profile, the soil remains untilled. Typically, the seeds are planted in a row about two inches below the surface of the ground and at an angle to the direction the ripper travelled. The density change at the profile interface will retard root growth and cause stress and non-uniformity in the plant growth.

Current strip tilling implements tend to use spring shanks that spring up and down as more or less compaction is encountered. Spring shanks tend to spring up and travel over a compacted area formed by, for example, crossing a previous tire track at some angle. The spring shank tip rising over the compacted spot compromises the desired results: straighter strips but leaves undesirable compaction in place. Straighter strips are less difficult to follow with a planter. However, the undestroyed compaction will have negative effects on crop yield. Therefore, spring shanks are not a good compromise for the practice of strip tilling.

This integrated system in the present invention uses rigid shanks that tear through the compacted tire track rather than rise over the compacted tire track. This integrated system uses auto rear steer to eliminate lateral skid and thus keeps the constructed row, free of compaction, precisely located, not crooked, and easier to follow with the planter. Additionally, this auto rear steer is controlled by a GPS system. This integrated system will reduce the amount of compaction created during planting-related operations and rip out compaction, created by harvest operations, from the new seed bed strip that it constructs.

Furthermore, those skilled in the art teach that plants, such as corn, need to develop uniformly throughout the growing season. This means that 1. Individual plants need to emerge uniformly.
2. Individual plant roots need to develop uniformly.
3. Individual plants need to receive food and water uniformly.

Those skilled in the art have made much progress in causing uniform emergence by improving the planter's row units. However, those skilled in the art have noted that the untilled soil below the peaks has a higher level of compaction than the tilled soil above the valleys. Conventional practice is for planters to travel at an angle to what the ripper traveled. Therefore, some plant roots expand downward into a valley having lower compaction and other plant roots expand downward and encounter peaks having higher compaction.

Those skilled in the art teach that root development stops for a period of time when the roots encounter the boundary defining the peak and the valley. Technically, this boundary is the location of soil density change. Roots stop and resize their diameter when soil density change is encountered. Therefore, root development of a plant located above a peak stops at a different time than does root development of a plant located above a valley. This is detrimental to uniform plant development.

This integrated system in the present invention constructs tilled strips forming narrow valleys and wide peaks centered between adjacent tilled strips. This integrated system places all seeds directly above the valleys.

In the late fall after harvest, strip till methods create rows of tapered slots about 30 inches apart; and simultaneously backfills the slots with tilled soil. In this case, a compaction layer may be located underground; created by heavy machinery used in the spring, summer, and during early fall harvest. In the following spring, seeds are planted about 2 inches below ground having roots growing down and the plant's stalk growing up. To create the slots, strip till methods use spring shanks that deflect upward when compacted soil is encountered. Current methods leaves the lower portion of the compaction layer in the path of the plant's roots in order to equalize side to side pull forces that otherwise cause lateral slide resulting in crooked rows. In this context, there could be a few problems associated with strip-till methods, that may cause non-uniform plant growths that result in yield loss and less financial income. A spring shank will flex upwards and does not penetrate through the compaction layer. A spring shank will flex upwards an additional amount when traveling at an angle over recent tire tracks that has added thickness to the compaction layer. Plant food application nozzles, attached to the spring shank, also move up and down causing an undesirable placement of the plant food. Moreover, some plants may encounter thicker layers of compaction than other plants, which would compromise the uniformity of plant growth. As mentioned above, the spring shank, typically used, constructs valleys having variable depth. Therefore, conventional strip till methods that manage to place seeds on the tilled strip construct a situation where some plant roots are going to experience growth interruption sooner that other plant roots. This is detrimental to uniform plant growth.

This integrated system constructs valleys having uniform depth. All plant roots will encounter any density change at the same time. This uniformity is desirable for max yields.

Conventional methods apply nitrogen with the applicator nozzle attached to a spring shank. Therefore, as the shank tip moves up and down and the position of nitrogen placement varies up and down. This is detrimental regarding nitrogen's initially escaping, leaching and being placed at a uniform depth. All plant roots need to reach nitrogen at a uniform time. This integrated system better enables the use of rigid shanks and positions nitrogen at a uniform depth.

Conventional methods spread phosphate and potash, on the surface of the soil. Conventional rippers are not able to mix these two plant food sources uniformly at a preferred depth. Soil within the peaks does not receive new applications of phosphate and potash. Ripped soil, falling into the valleys, receives some of the new applications of phosphate and potash.

Much of the new application of phosphate and potash remains near the surface for at least one growing season. When drought causes the upper few inches of soil to dry out, upper roots become inactive and that phosphate and potash is then unavailable.

This integrated system, using auto rear steer, permits rigid shanks to rip deeper, at a more uniform depth, and construct a straighter row than conventional methods. All the plant foods, nitrogen, phosphate and potash, can be more uniformly and better placed within the valley of the tilled strip. Therefore, individual plants develop and grow more uniformly with this integrated system than with conventional methods.

Moreover, the integrated system is more user-friendly and more cost-effective than conventional strip till methods. The auto rear steer feature is the main reason this integrated system is more user-friendly. Those farmers skilled in constructing tilled strips using conventional strip till methods are prone to complain that conventional strip tilling methods are not user-friendly. This makes conventional methods tiresome to operate for long periods of time and makes it difficult to find hired help capable of operating conventional strip tilling systems.

This integrated system is more cost-effective than conventional methods because it reduces some of the causes of compaction. It focuses ripping to a narrow strip directly below the seed location. It reduces trips over the field to apply nitrogen, phosphate and potash. It results in better first-year use of new applications of phosphate and potash than conventional methods. It shares expensive components between the strip tiller and the planter. It meets the needs of "professional farmers" to carry more nitrogen, phosphate and potash before requiring re-filling of the containers. It allows the use of less expensive lower skilled operators. Moreover, it provides row to row exact lateral spacing to match the current technology that provides exact longitudinal (within a row) spacing of seed for maximum yield. And finally, it spreads to the cost of the core machinery between operations to establish first the tilled strips and then spring planting precisely into the tilled strip.

In summary, unlike the conventional methods, the integrated system provides a strip, as a tapered slot, having 100% compaction-free area directly below each plant. It causes plants to develop uniformly, quicker, and with minimal stress. It keeps the tilled strip at a constant depth; and extends the tilled strip to below the compaction layer. Additionally, it applies plant food at a uniform and preferred depth close to where the plant's roots will be located. Finally, the auto rear steer feature of this integrated system is an improvement over conventional methods and keeps the tilled strips precisely located in the lateral direction.

In reference to FIG. 1, the preferred embodiment of the present invention comprises certain specific technical features. The undercarriage 101 is behind the toolbar 102. The weight of supplies 103 is directly above the undercarriage 101. And the weight of supplies is not raised and lowered. There is generous space for tire options and track options. In addition, the current invention applies combine header height control technology to the center portion of toolbar. A unique mechanism of maintaining proper height of toolbar ends 104. The rear steer 105 prevents row unit 106 lateral skid. A GPS unit 108 is laterally centered and fore-aft directly above the row unit. There is also a unique method of fold up for transport.

Figure 2:
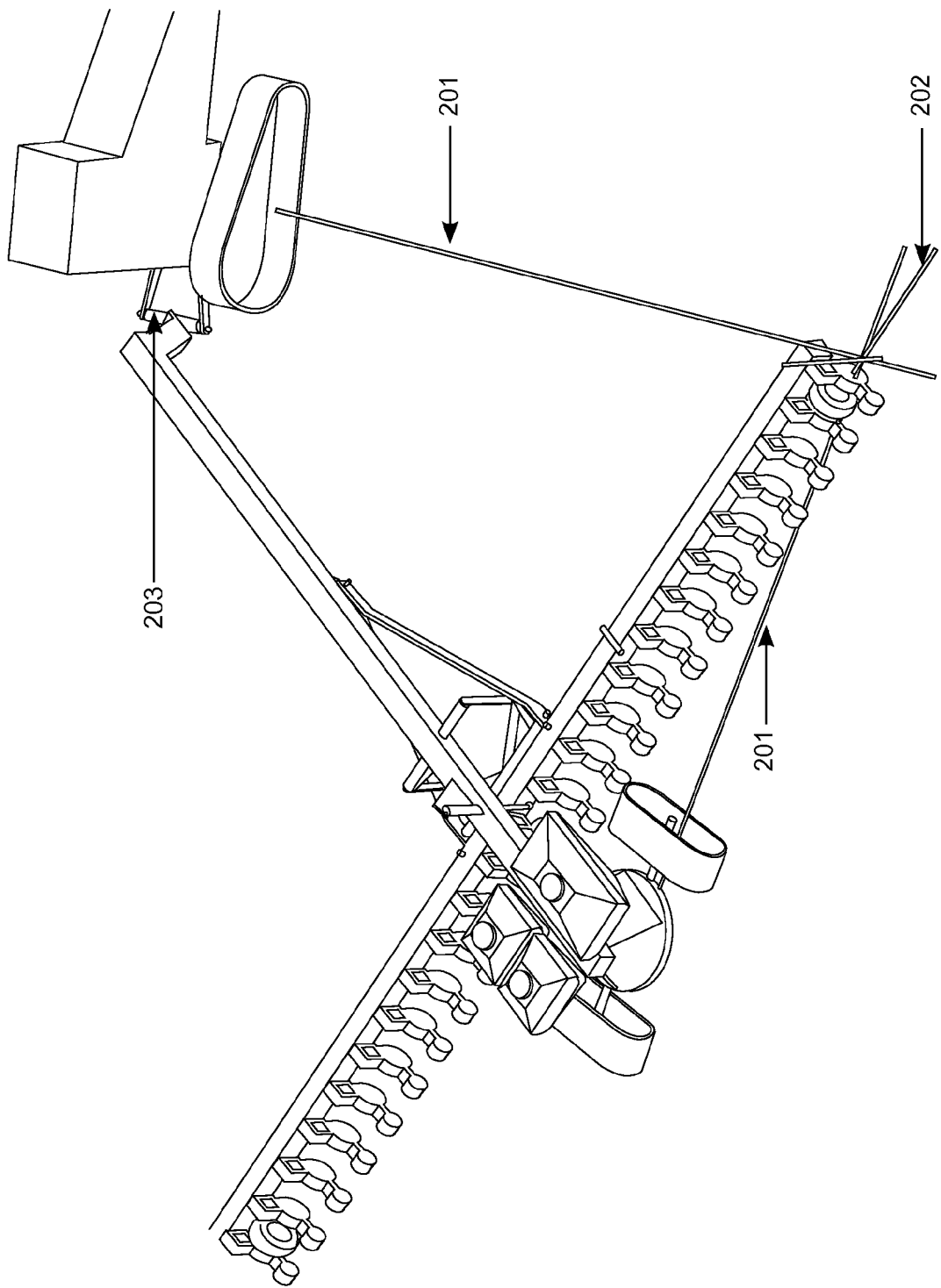
FIG. 2 is a rear perspective illustration of an operating radius of the preferred embodiment of the present invention.

In reference to FIG. 2, the preferred embodiment of the present invention comprises the following technical features with its operating radius: 1) the axle lines of tractor and planter undercarriage 201 need to intersect on the row units axle 202 line for all radii; 2) turn angle sensor is needed on planter's draft arm hitch (front 2-point hitch) 203; 3) rear steering uses closed loop continuous feedback system; the software math for rear steer is simple and exact and the turn-around situation is illustrated and represents max steer angles.

Figure 3:
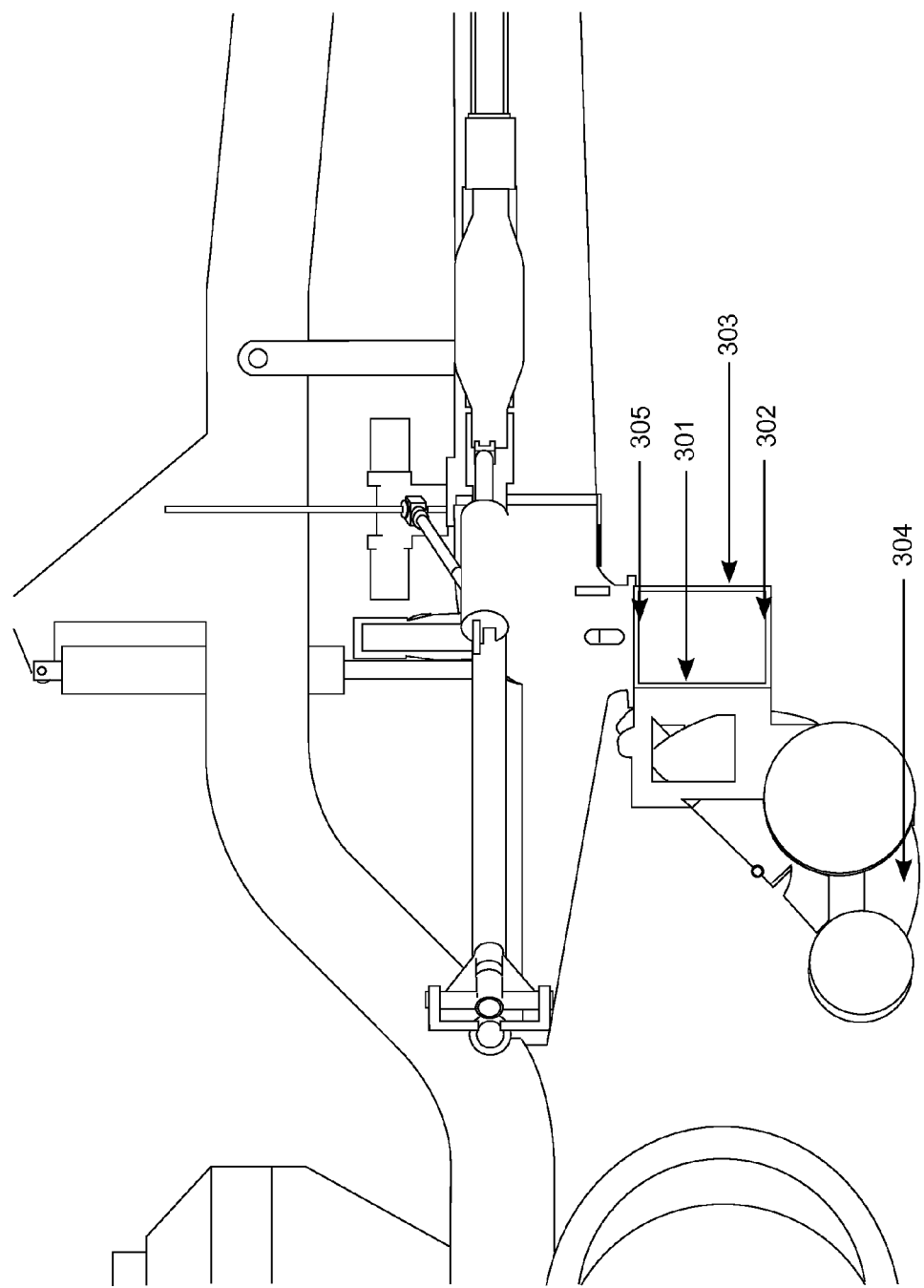
FIG. 3 is a right-side illustration of a plurality of row units of the preferred embodiment of the present invention.

In reference to FIG. 3, the preferred embodiment of the present invention comprises the following features of its unobstructed locations for row units: 1) back 301, bottom 302, and front 303 of toolbar is mostly unobstructed; 2) row unit location is only limited by interference with another row unit or interference with the wing wheel 304 at the end of the toolbar; 3) toolbar structural attachments protrude only on top of the toolbar.

Figure 4:
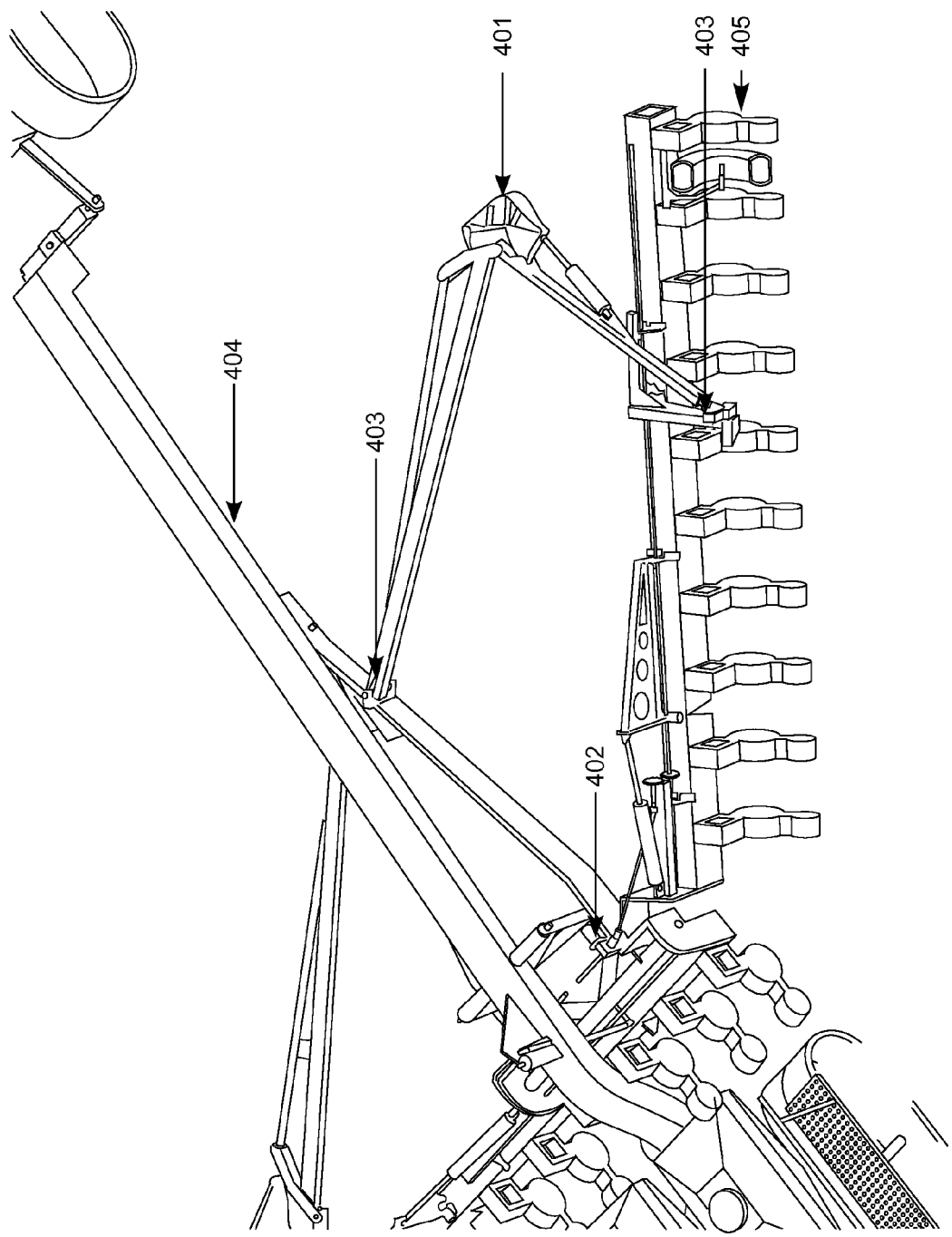
FIG. 4 is a top perspective illustration of a tow bar of the preferred embodiment of the present invention while in a folding configuration.

In reference to FIG. 4, the preferred embodiment of the present invention comprises the following features of its unique tow bar power fold: 1) wing's tow bar power jack-knifes 401; 2) minimal stress at the toolbar's fold-up pivot joint 402; 3) wing wheel supports toolbar's end weight during fold-up procedure; 4) offset weight of tow bar is supported by unique structure at both ends of the tow bar 403. Moreover, concerning the tow bars, its design helps to transfers the outer group of row unit's rolling resistant forces into the center frame 404; reduces the horizontal, backwards-bending moments on the toolbar assembly 405; reduces the toolbar's required weight; provides the force needed to fold up and unfold the implement; power jack-knife 401 omits the need for a heavy telescoping tongue assembly containing an expensive hydraulic cylinder; holds the wings in folded position. Furthermore, the tow bar's offset center of gravity creates a cantilever moment at the ends of the tow bar; and both ends of the tow bar need a cantilever weight-carrying capability.

Figure 5:
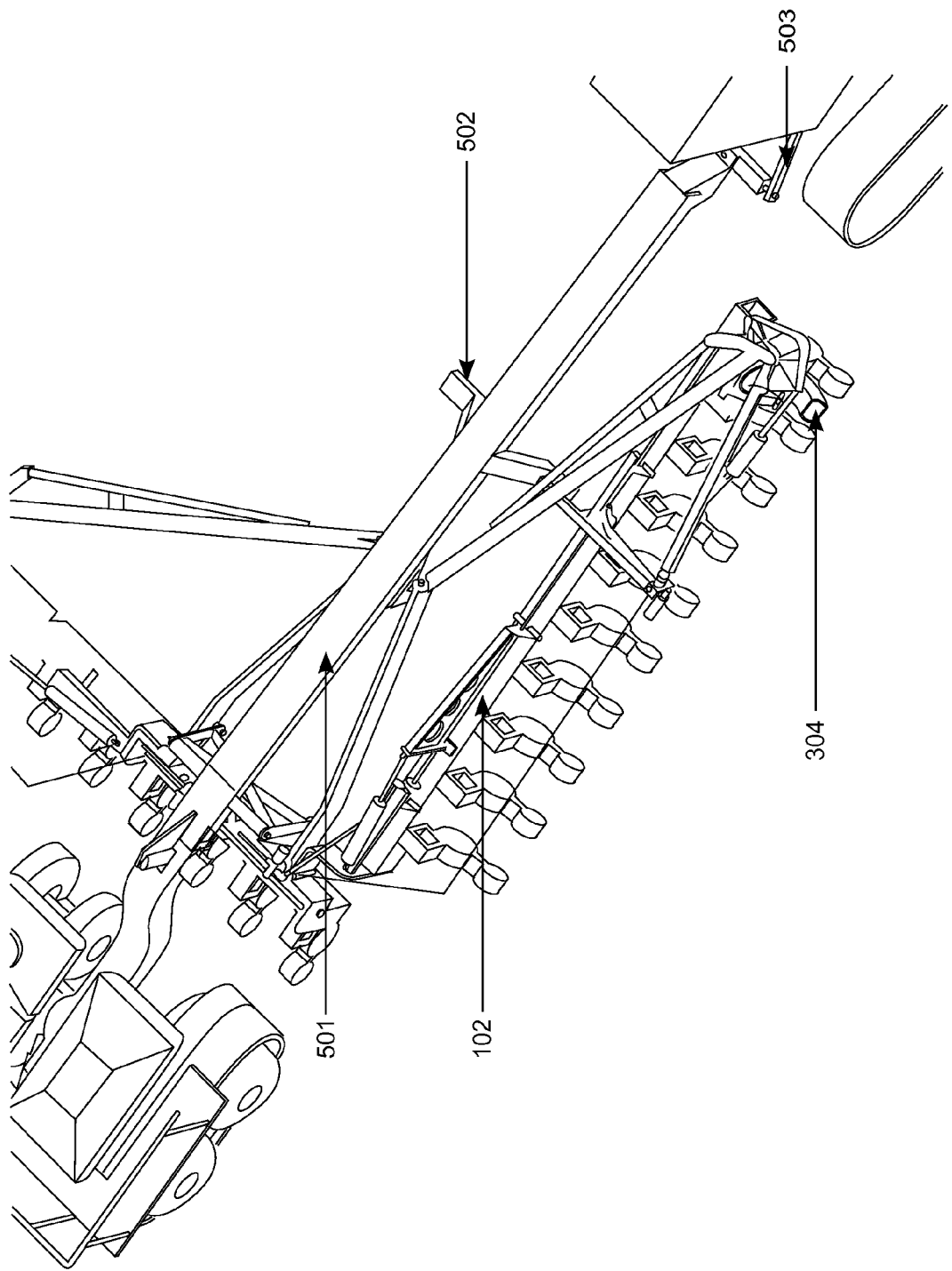
FIG. 5 is a top perspective illustration of the tow bar of the preferred embodiment of the present invention in a completely folded configuration.

In reference to FIG. 5, the preferred embodiment of the present invention comprises the following features when it is completed folded: 1) folds to transportable width; 2) tow bar folds about 150 degrees; 3) toolbar 102 and main frame 501 have match-up carry pads 502; and 4) for transporting on the road, wing wheels 304 retract and draft arms 503 raise.

Figure 6:
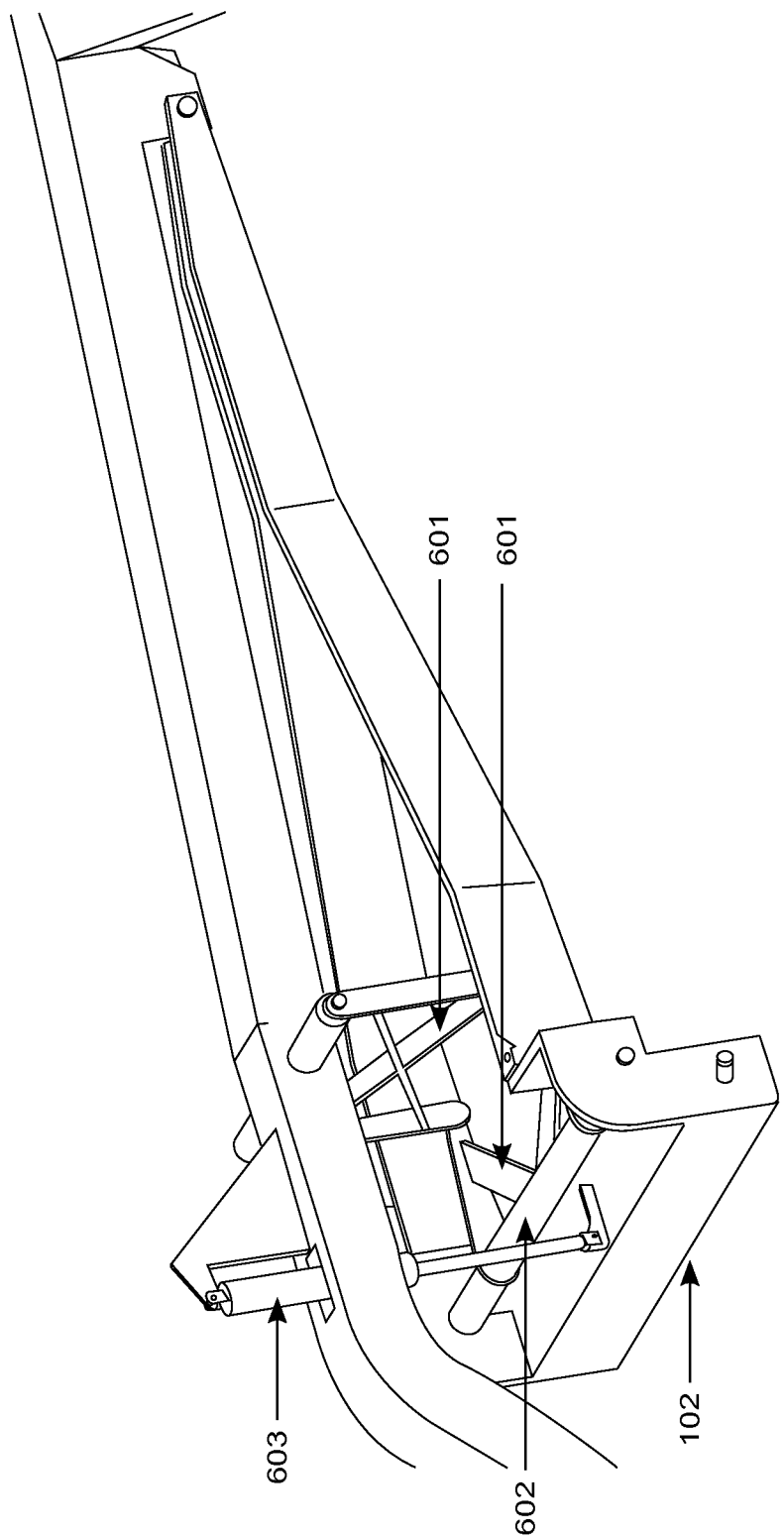
FIG. 6 is a right-side perspective illustration of a center structure of the preferred embodiment of the present invention.

In reference to FIG. 6, the preferred embodiment of the present invention comprises the following features of its center structure: 1) it has some characteristics similar to a motor grader; 2) toolbar 102 is restrained laterally by link bracing 601; 3) toolbar is restrained from tipping to one side by a torque tube 602; 4) one vertical cylinder 603 is used to raise and lower toolbar's center section (wing wheels raise and lower the ends of the toolbar).

Figure 7:
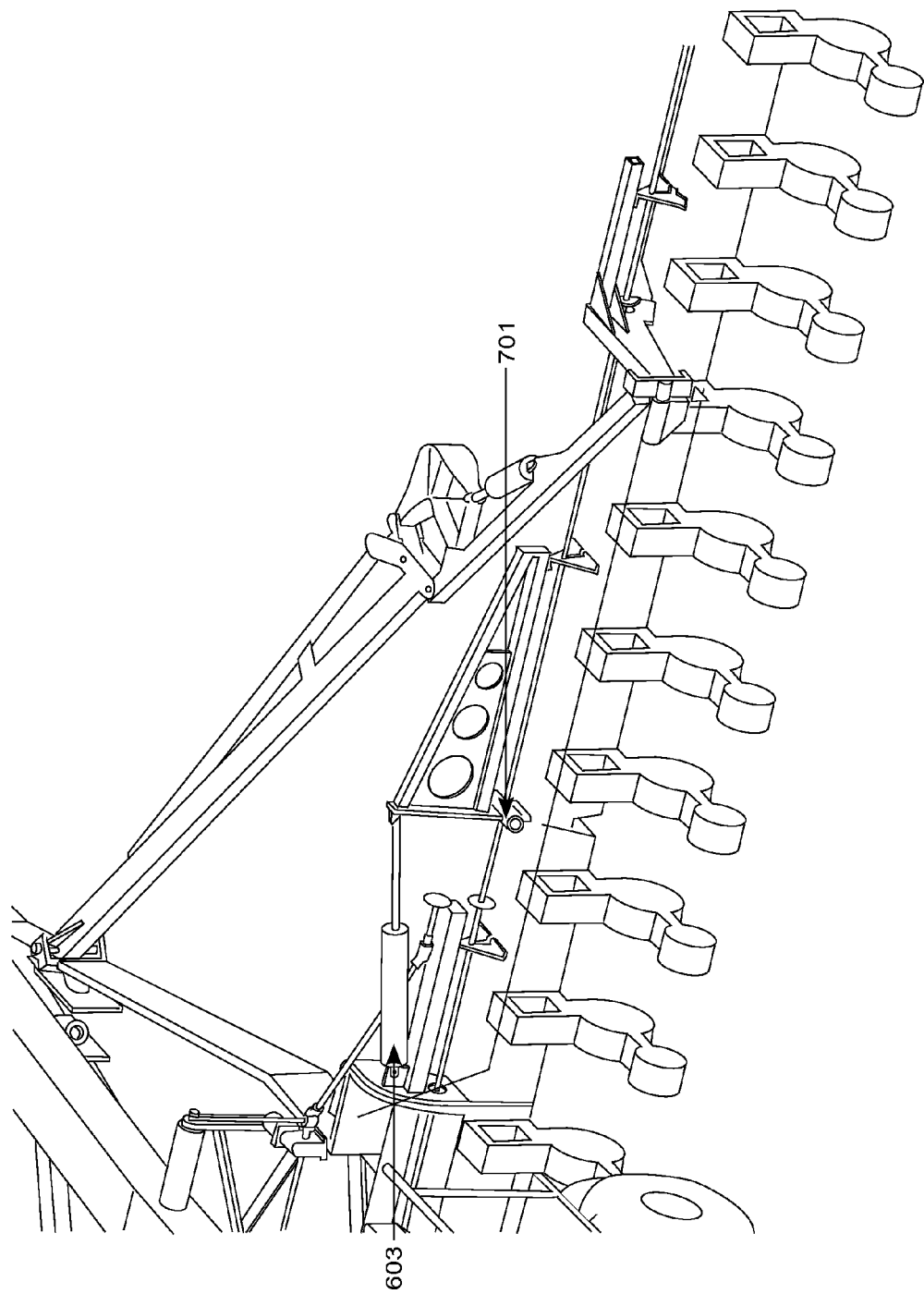
FIG. 7 is a rear perspective illustration of a quick responding wing wheel load management mechanism of the preferred embodiment of the present invention.

In reference to FIG. 7, the preferred embodiment of the present invention comprises the following features of its quick responding wing wheel load management mechanism: 1) wing wheel load is maintained at a consistent low value; 2) toolbar height remains consistent which prevents the down force system from elevating the toolbar; 3) hydraulic cylinder 603 applies an appropriate moment at the wing's pivot 701; and 4) the applied moment maintains a low load on the wing's wheel.

Figure 8:
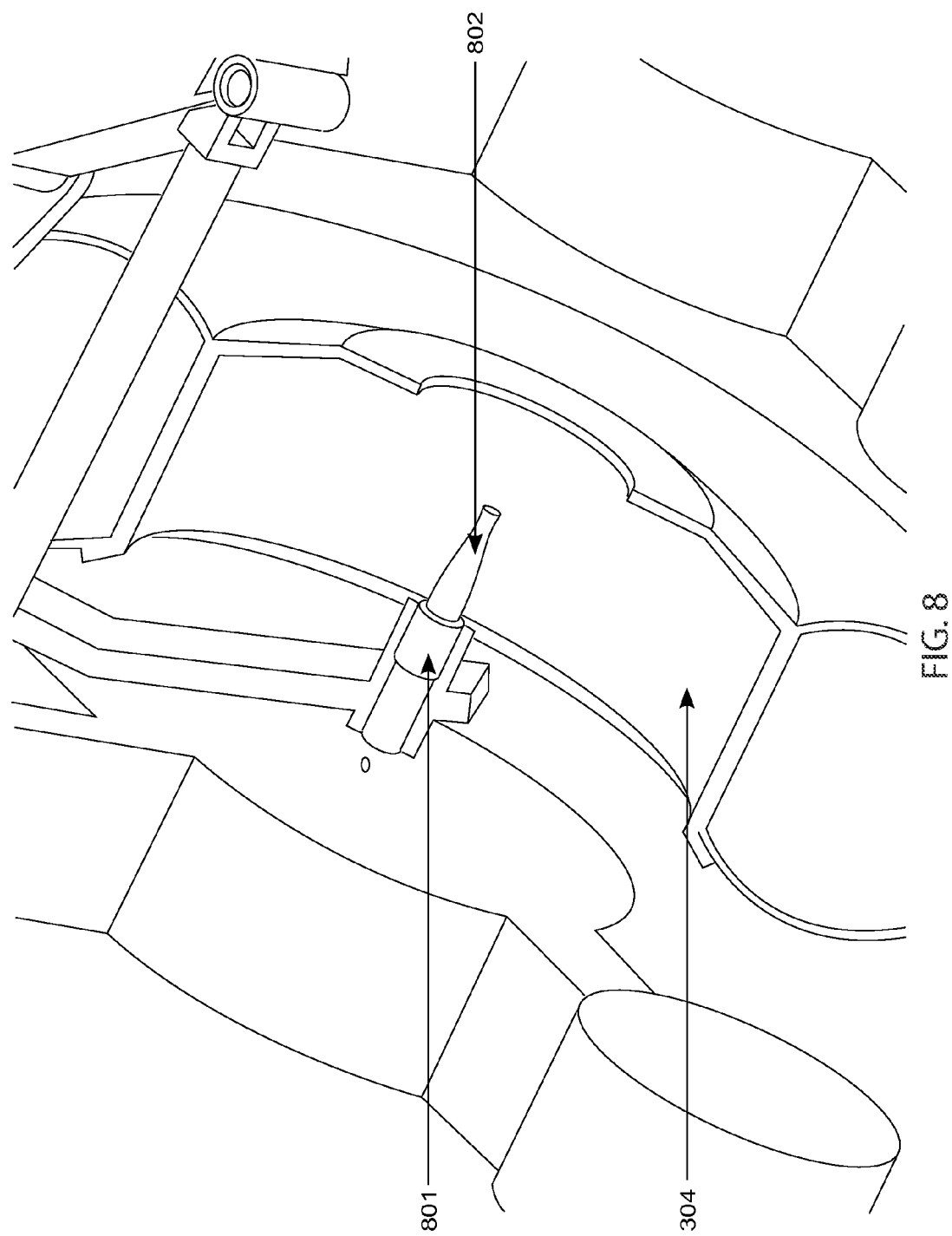
FIG. 8 is a perspective cut-section illustration of a load cell in wing wheel spindle of the preferred embodiment of the present invention.

In reference to FIG. 8, the preferred embodiment of the present invention comprises the following features of its structure of load cell in wing wheel spindle: 1) load cell signal is used to maintain a consistent low load on the wing's wheel 304; 2) load cell 801 works in conjunction with the hydraulic cylinder 603; 3) minimal rutting helps assure a consistent toolbar height at its end; 4) wheel compaction is minimal; 5) toolbar excess weight is not required for the down force system to not elevate the toolbar; 6) load cell in the wheel spindle 802 is a developed technology.

Figure 9:
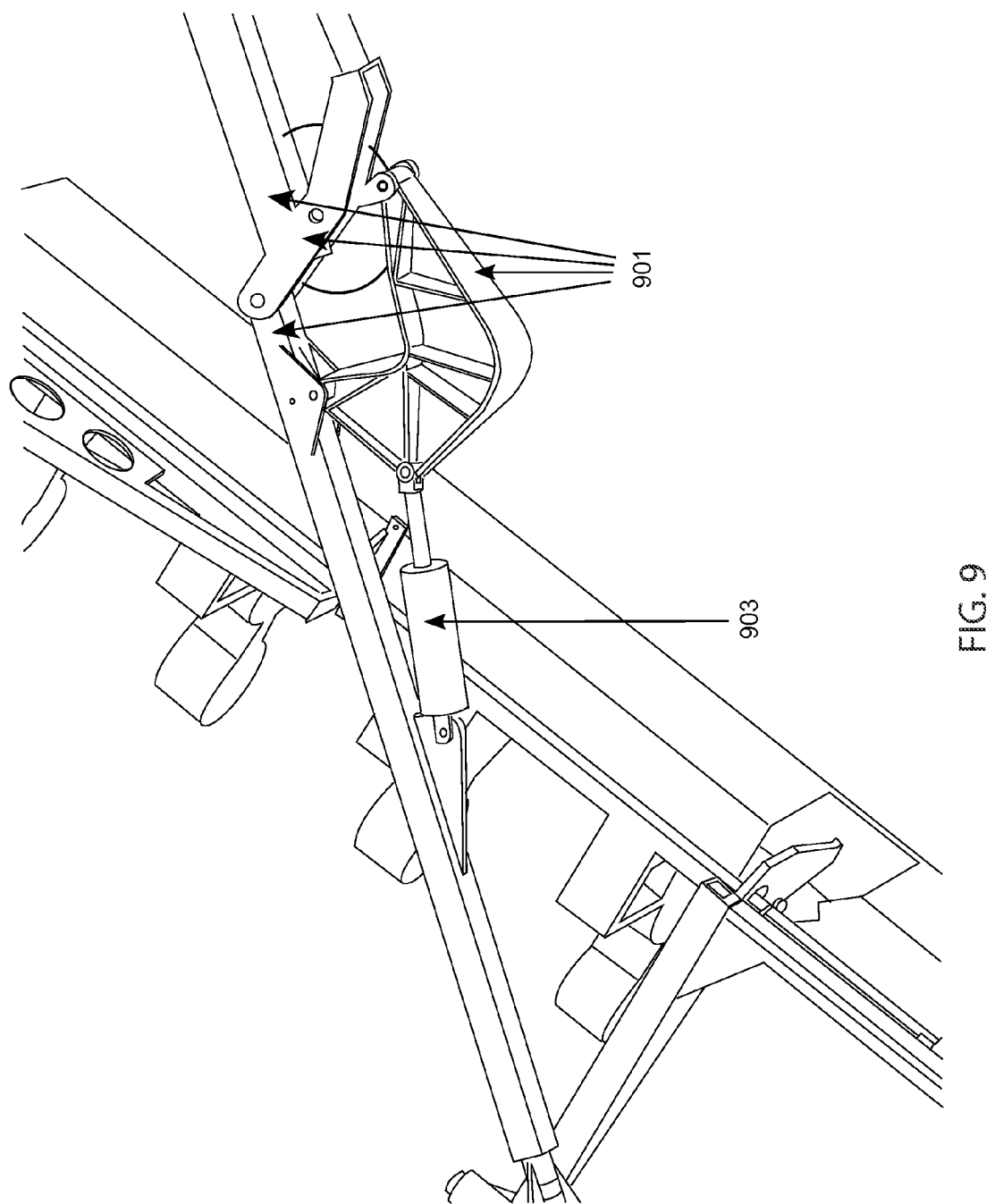
FIG. 9 is a top perspective illustration of the tow bar's power jack-knife mechanism of the preferred embodiment of the present invention.

In reference to FIG. 9, the preferred embodiment of the present invention comprises the following features of the tow bar's power jack-knife mechanism: 1) uses a unique four-bar linkage 901; 2) power jack-knifes from straight to about 160 degrees; 3) uses a mass produced, cost effective, hydraulic cylinder 903; 4) cylinder's mechanical advantage varies from theoretical infinity to about 1/20.

Figure 10:
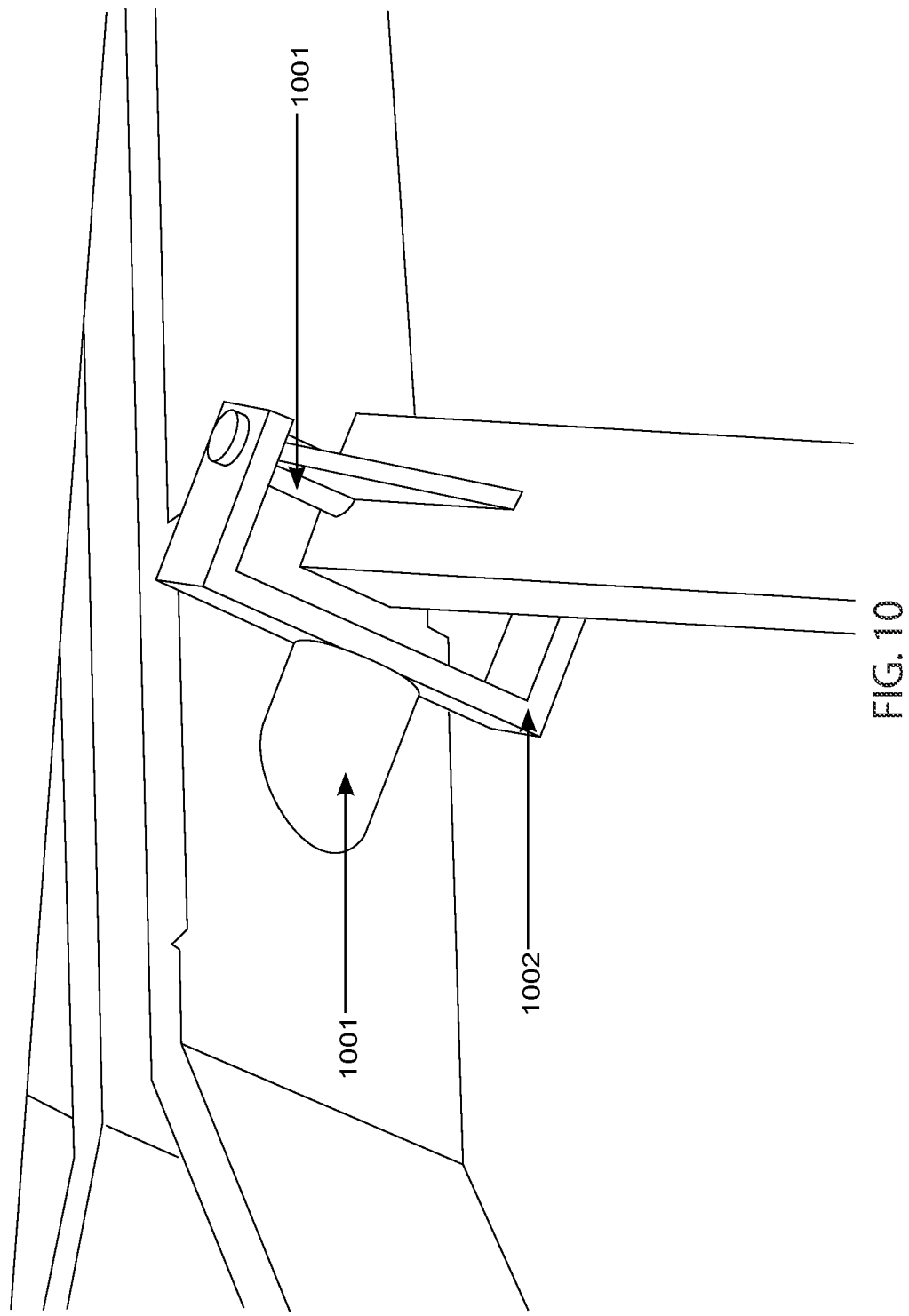
FIG. 10 is a rear perspective illustration of the tow bar's front support mechanism of the preferred embodiment of the present invention.

In reference to FIG. 10, the preferred embodiment of the present invention comprises the following features of the tow bar's front support mechanism: 1) two degrees of freedom 1001 are needed (allow the toolbar's wing to move up and down and allow the wing to fold up); 2) the yoke 1002 having a strong spindle is needed (spindle not shown); 3) yoke spindle needs two bearings spread apart (bearings not shown); 4) front yoke is required to support a major portion of the cantilevered load when the tow bar's jack-knife angle is between about 45 degrees and about 135 degrees; 4) tow bar experiences some torsion and always holds the end yokes near vertical.

Figure 11:
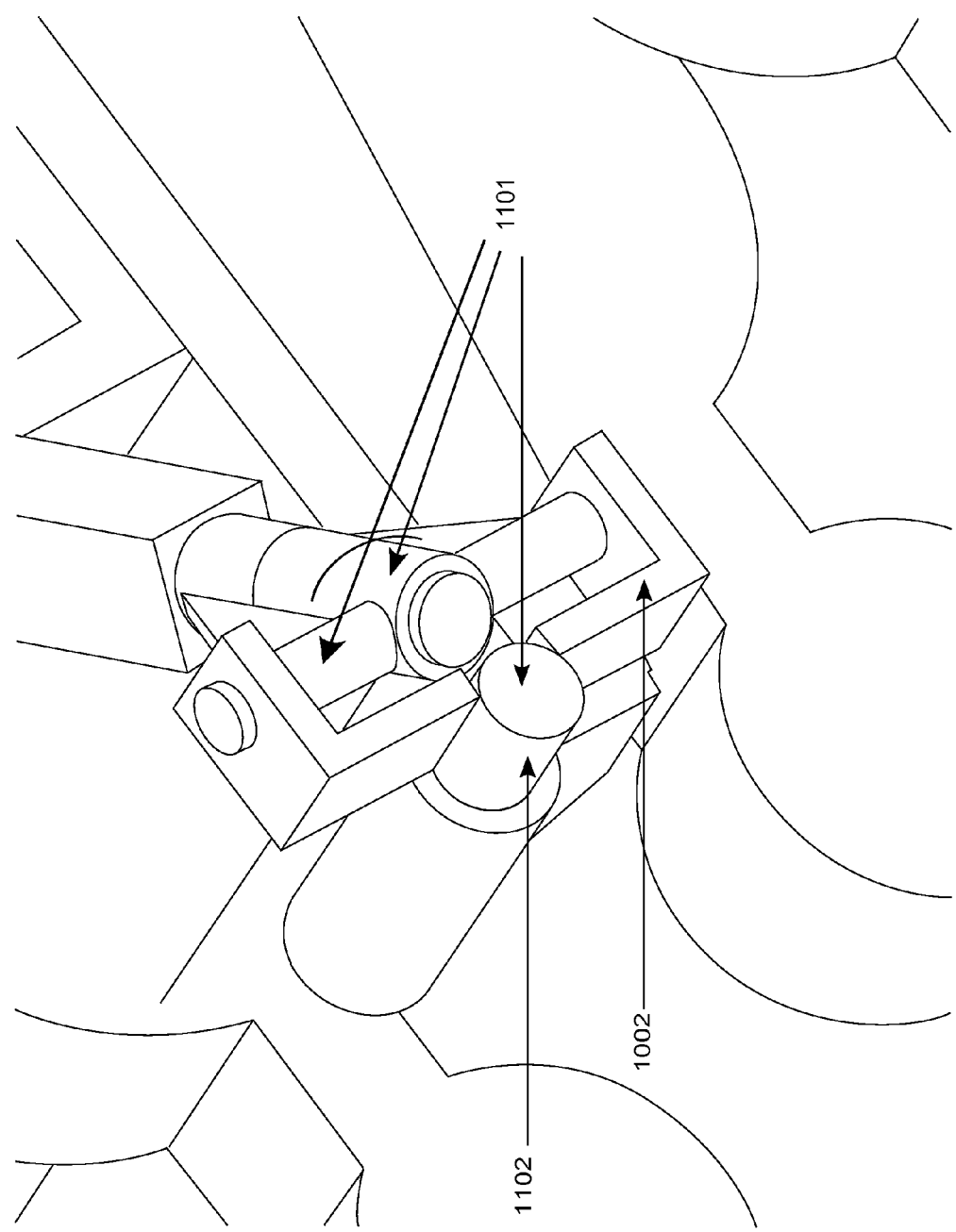
FIG. 11 is a rear perspective illustration of the tow bar's rear attachment detail of the preferred embodiment of the present invention.
Figure 12:
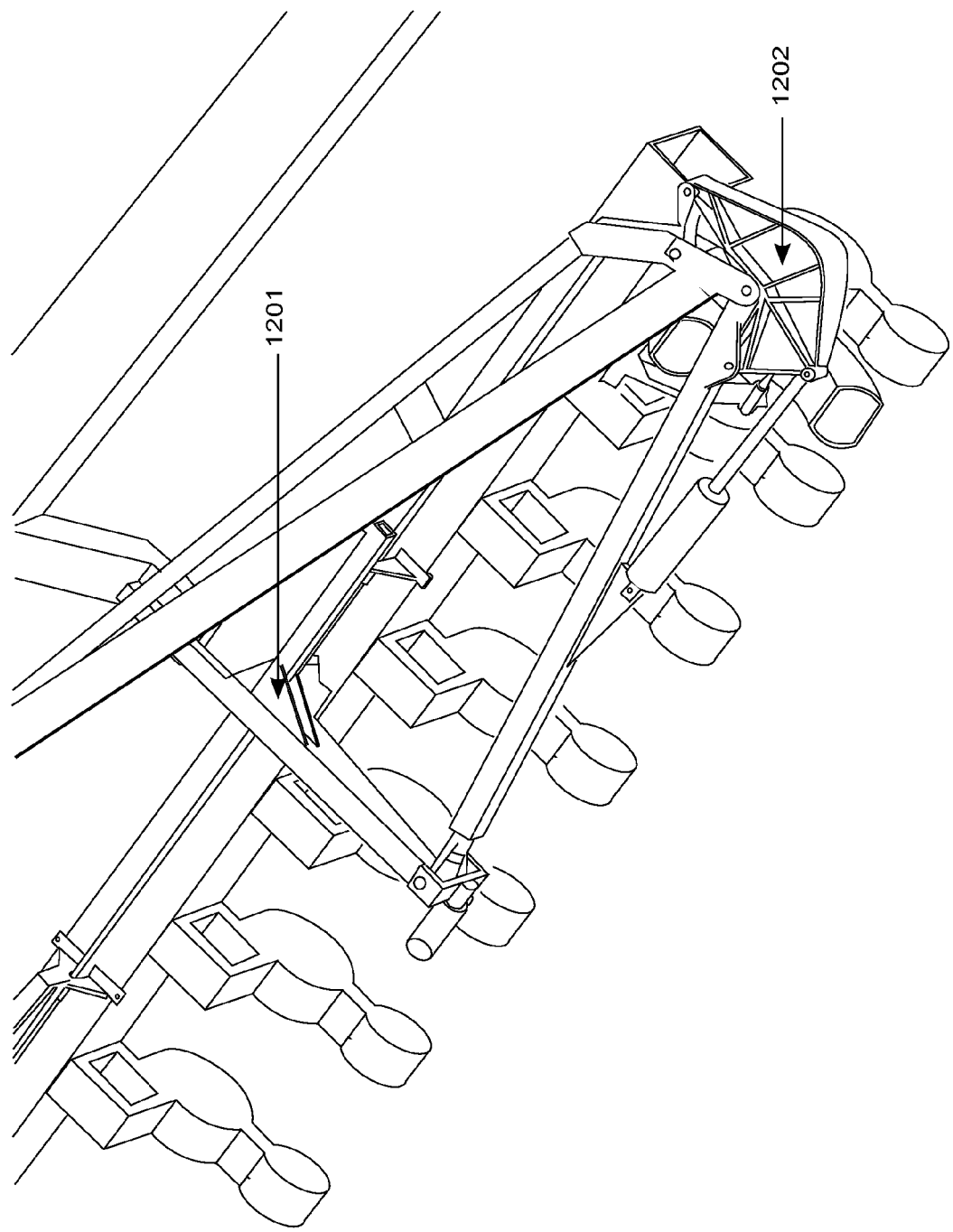
FIG. 12 is a top perspective illustration of the tow bar's rear attachment detail of the preferred embodiment of the present invention in a folded configuration.

In reference to FIG. 11, the preferred embodiment of the present invention comprises the following features of the tow bar's rear attachment detail: 1) three degrees of freedom 1101 needed (one for wing's end moving up and down and one for wing angling up and down and one for fold-up); 2) the strong yoke 1002 and strong yoke spindle 1102 is needed; 3) needs two spindle bearings spread apart (not shown); 4) help carry the cantilevered weight and prevent the yoke from rotating to a horizontal position, the wing-angling freedom needs an angle stop limited to the wing's max flex angle. In addition, in reference to FIG. 12, the tow bar's rear attachment 1201 will supports most of the tow bar's cantilever 1202 weight when in a fold up position.

Figure 13:
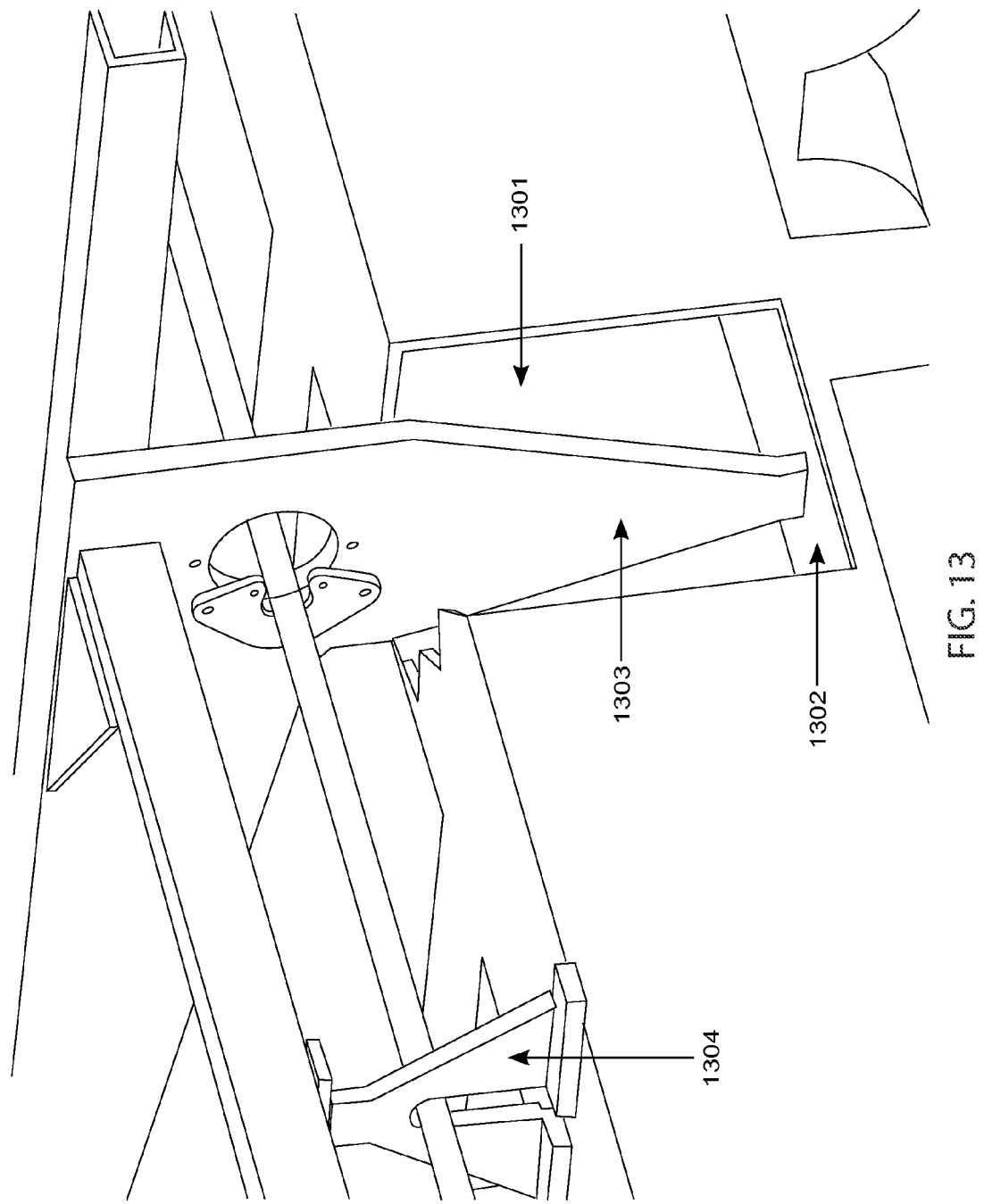
FIG. 13 is a front perspective illustration of the center structure attachment method of the preferred embodiment of the present invention.

In reference to FIG. 13, the preferred embodiment of the present invention comprises the following features of the center structure attachment: 1) uses space in the center of the toolbar 1301; 2) groove 1302 welded with no protrusion at the bottom; 3) vertical plate 1303 is braced for added strength in torsion and bending; 4) clamp-on support bracket 1304 is positioned laterally where ever the row units allow room.

Figure 14:
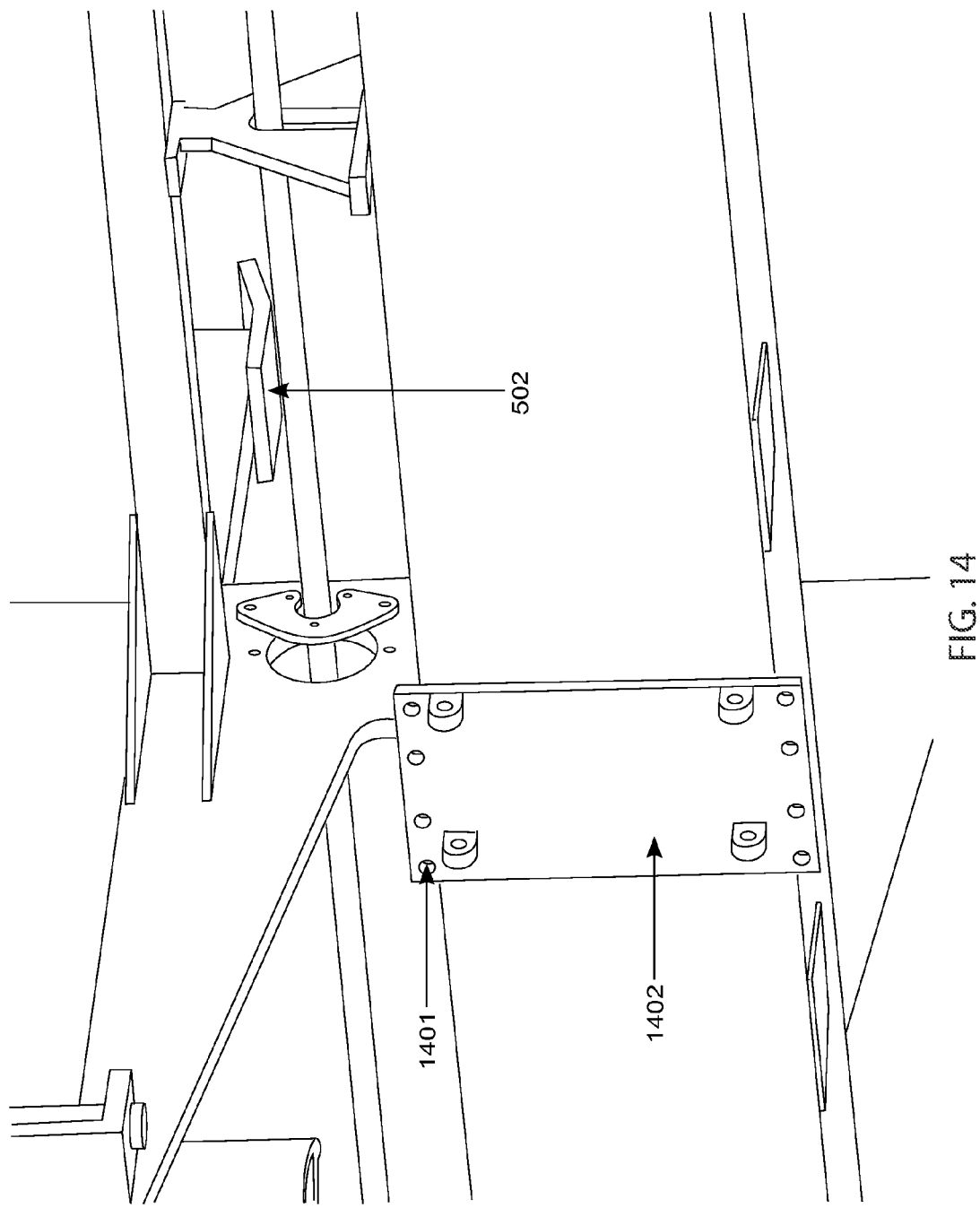
FIG. 14 is rear perspective illustration of a plurality of row unit adapter's clamp bolt locations of the preferred embodiment of the present invention.

In reference to FIG. 14, the preferred embodiment of the present invention comprises the following features of a plurality of row unit adapter's clamp bolts: 1) alternate clamp bolt locations eliminate top structures from imposing a restriction on where a row unit can be placed; 2) adapter's holes 1401 for clamp bolts have specific offsets; 3) flipping the adapter plate 1402 upside down doubles the clamp bolt location options (in the background, the wing's match-up carry pad 502 for road transportation is illustrated).

Figure 15:
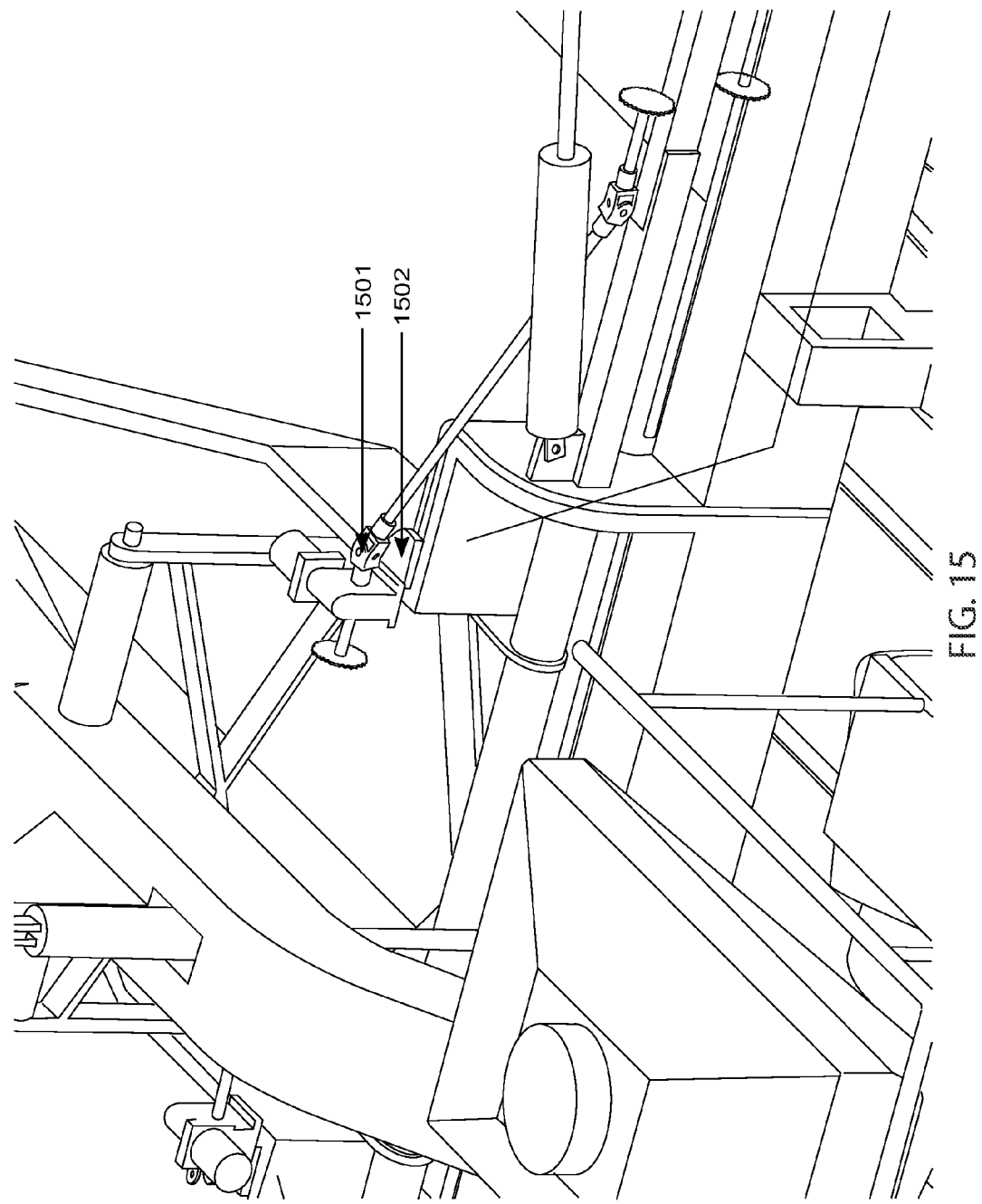
FIG. 15 is a top perspective illustration of a hydraulic drive for row units of the preferred embodiment of the present invention.
Figure 16:
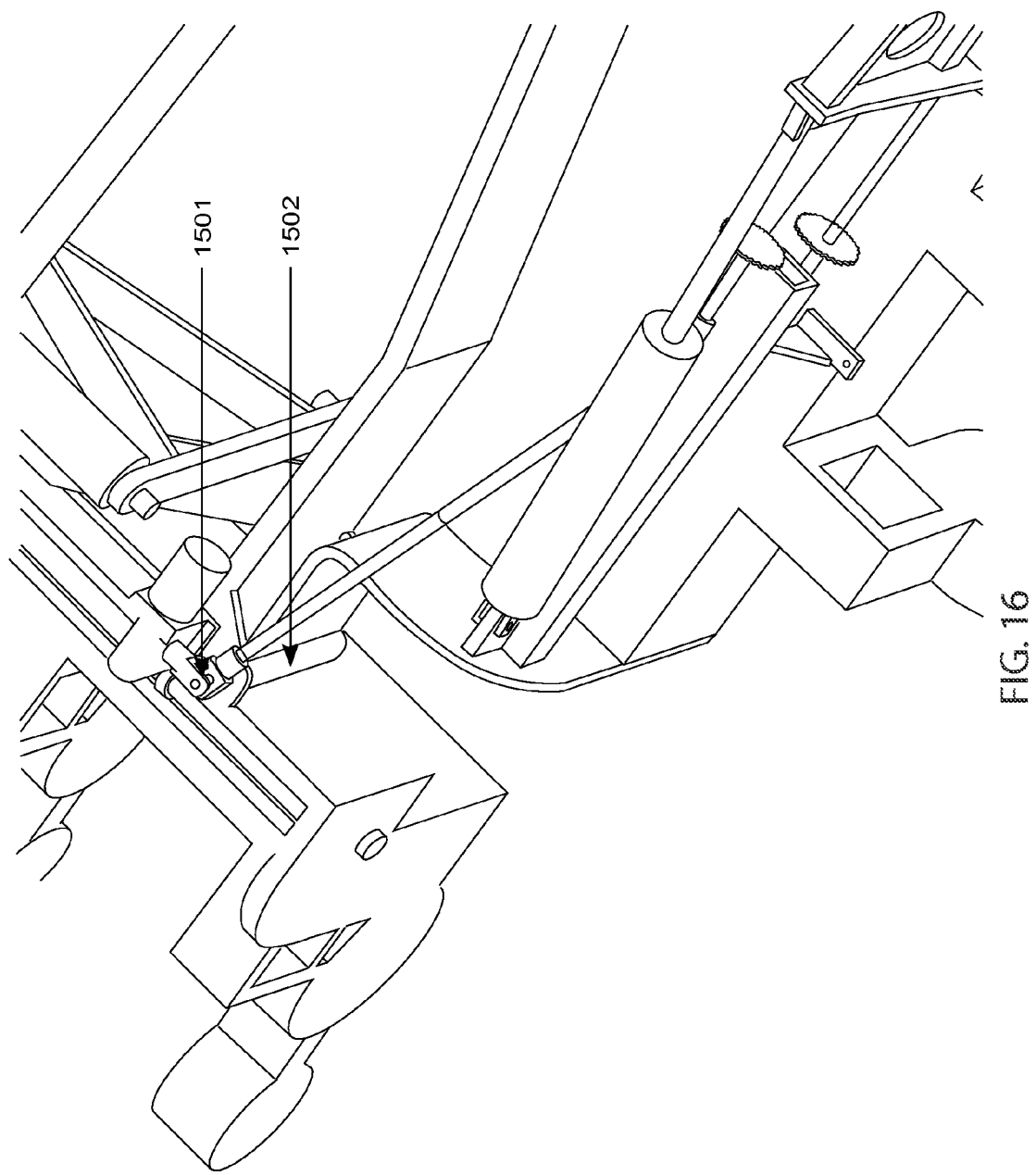
FIG. 16 is a top perspective illustration of the row unit's drive mechanism in a fold-up position of the preferred embodiment of the present invention.

In reference to FIG. 15, the preferred embodiment of the present invention comprises the following features of the hydraulic drive for row units: 1) no fold-up disconnect is needed at the fold-up joint; 2) a u-joint's cross 1501 is positioned on center with the wing's fold-up pivot pin 1502. In reference to FIG. 16, the preferred embodiment of the present invention comprises the following features of the row unit's drive mechanism in a fold-up position: 1) positioning the u-joint's cross 1501 centered above the fold-up pivot pin 1502 avoids the need for a telescoping shaft.

Figure 17:
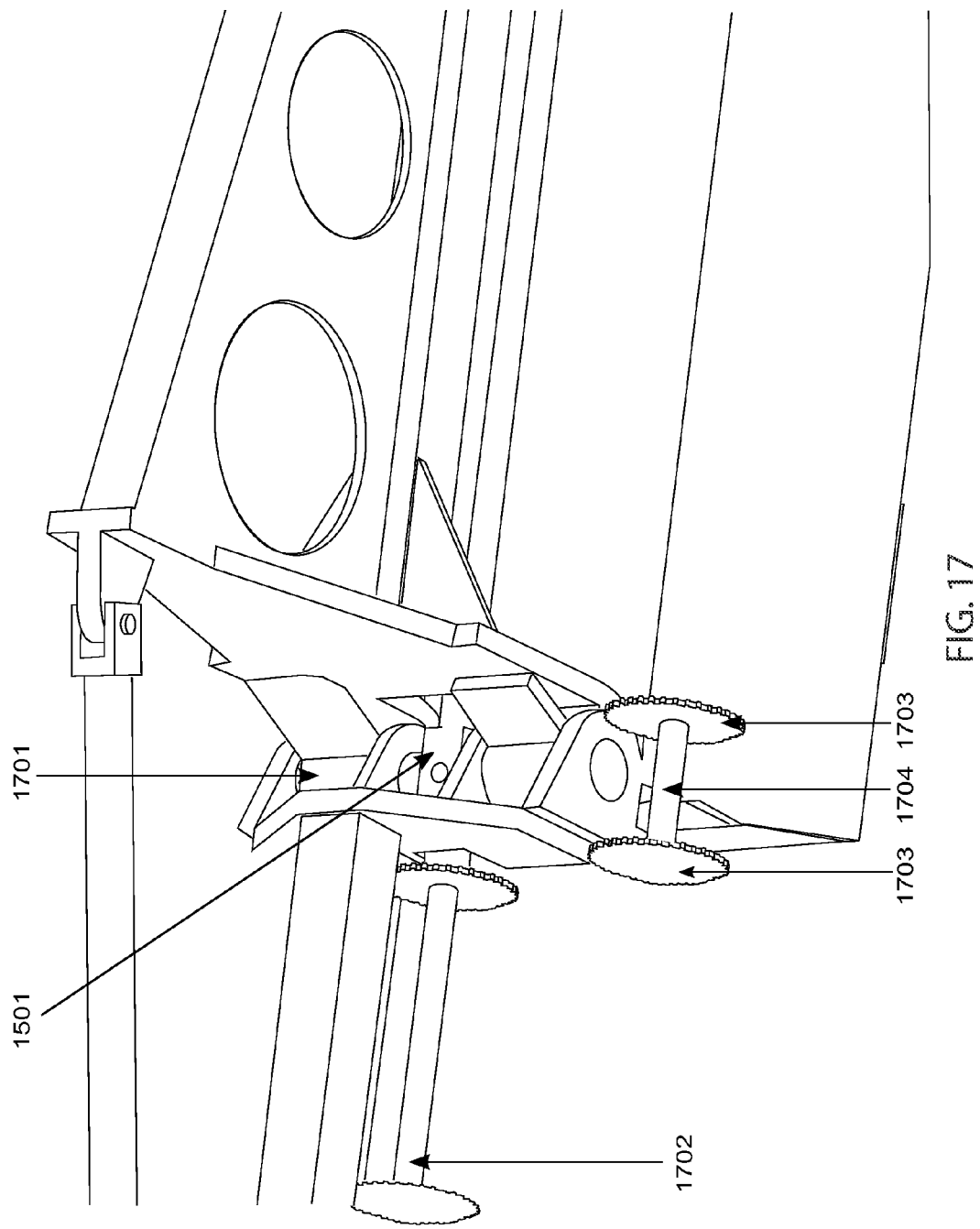
FIG. 17 is a top perspective illustration of a wing pivot detail of the preferred embodiment of the present invention.

In reference to FIG. 17, the preferred embodiment of the present invention comprises the following features of the wing pivot detail: 1) u-joint's cross 1501 is centered with the pivot 1701 in both the vertical and lateral planes; 2) some of the chain drives 1702 are likely to need an offset or the row unit needs two lateral positions 1703 for its driven sprocket 1704.

Figure 18:
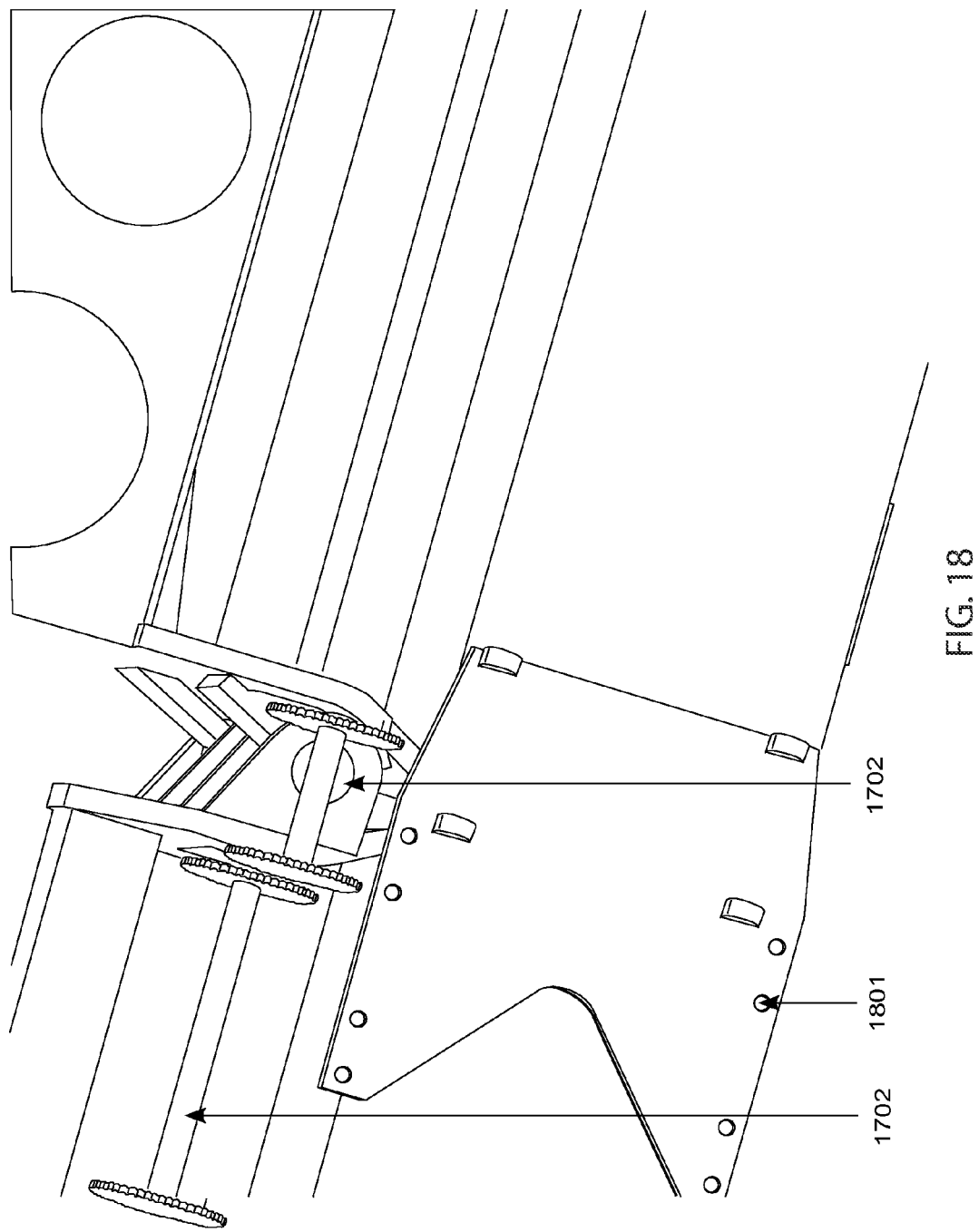
FIG. 18 is a rear perspective illustration of a wing pivot offset adapter of the preferred embodiment of the present invention.

In reference to FIG. 18, the preferred embodiment of the present invention comprises the following features of a wing pivot offset adapter: clamp bolts 1801 and chain drive 1702 needs to be on the same side of the pivot 1701 in order to maintain the drive chain's alignment.

Figure 19:
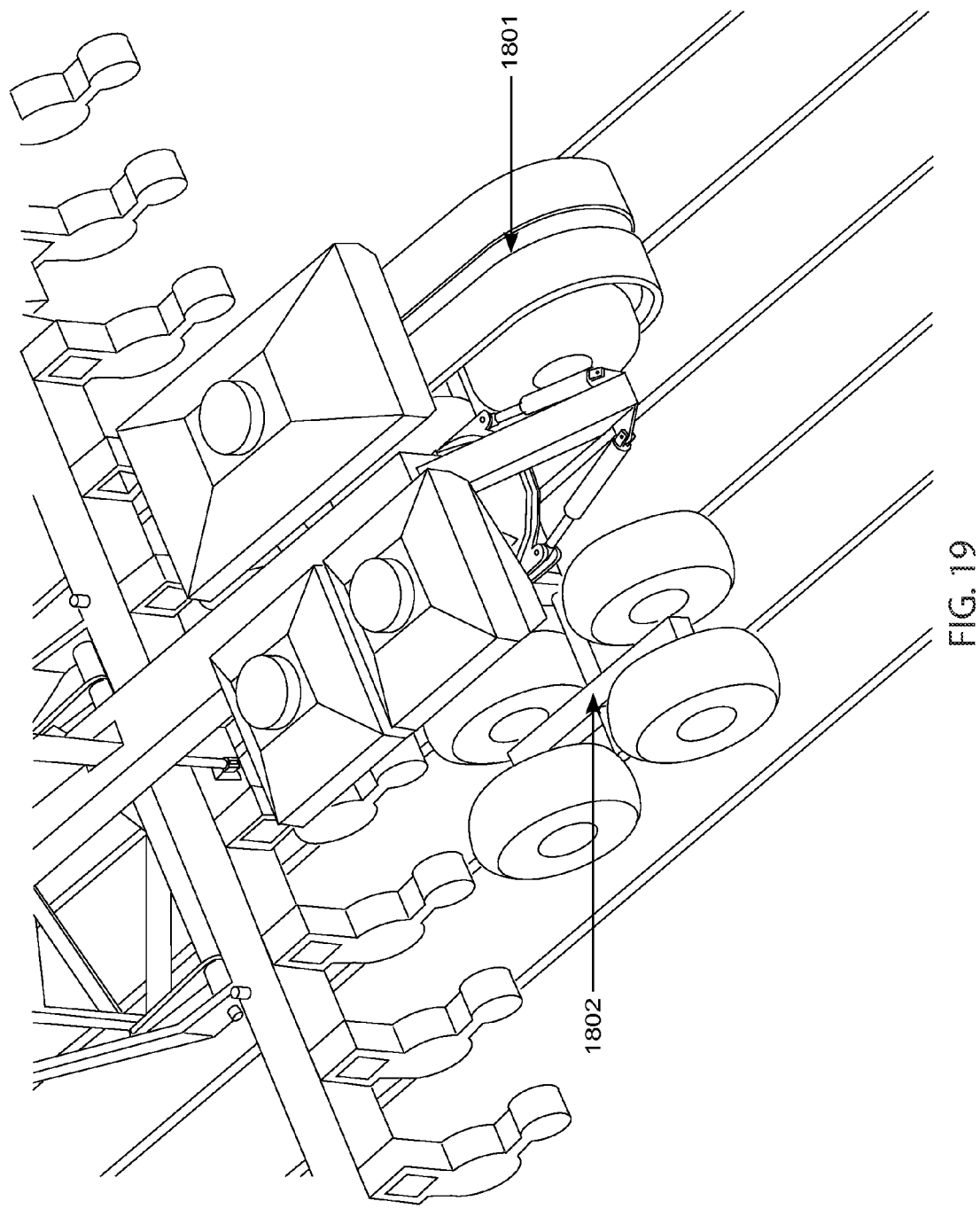
FIG. 19 is a top perspective illustration of a compaction reduction mechanism of the preferred embodiment of the present invention.

In reference to FIG. 19, the preferred embodiment of the present invention comprises the following features of a compaction reduction mechanism: 1) there is room for track options 1901; 2) there is room for tire options 1902.

Figure 20:
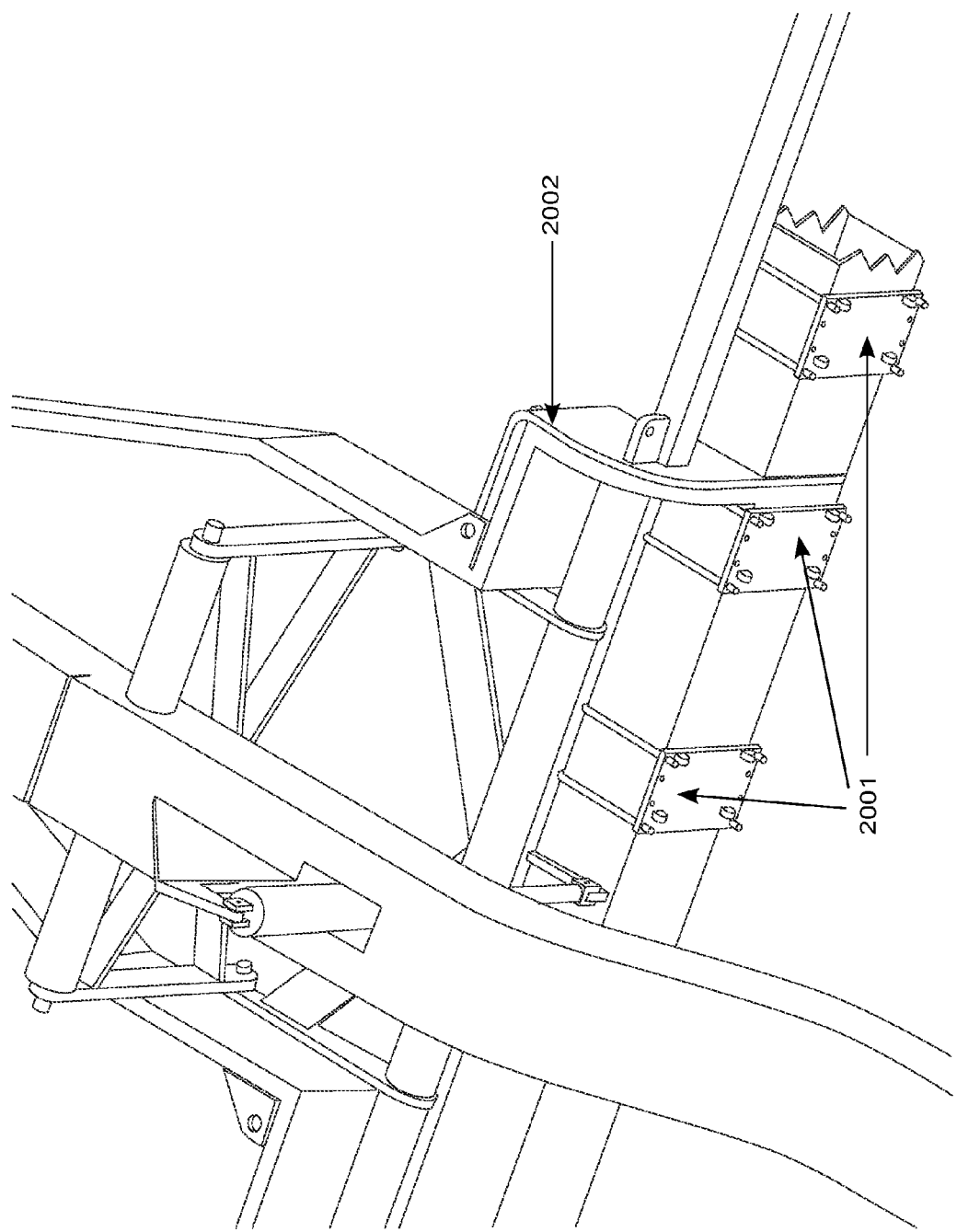
FIG. 20 is a top perspective illustration of a 30 inch row spacing at fold-up joint of the preferred embodiment of the present invention.
Figure 21:
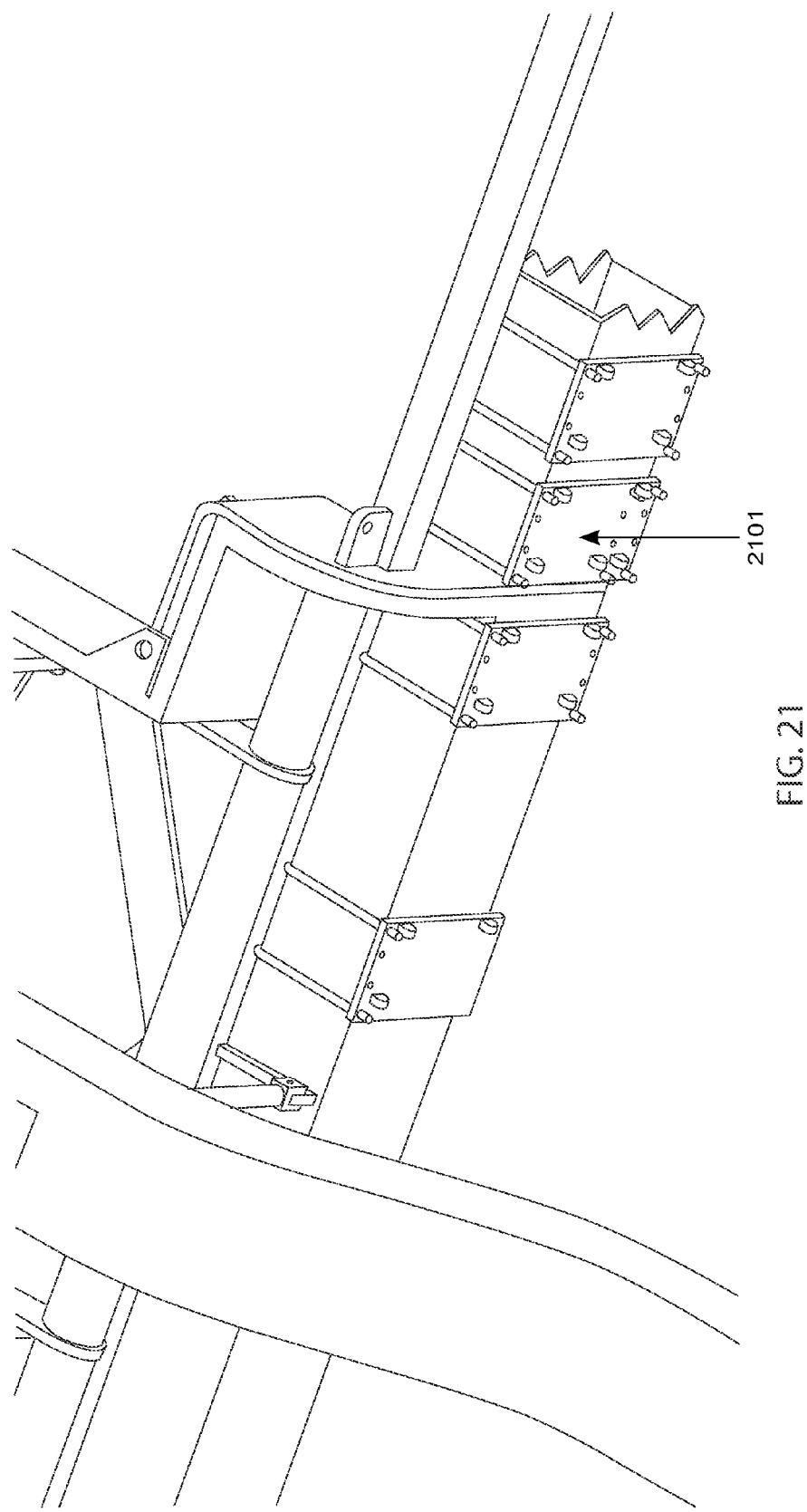
FIG. 21 is a top perspective illustration of a plurality of 30 inch split-rows of the preferred embodiment of the present invention.

In reference to FIG. 20 and FIG. 21, it illustrates a 30 inch row spacing 2001 at fold-up joint 2002, a plurality of 30 inch split-rows, and how a rear mounted split-row row unit 2101 would attach at the fold-up of the preferred embodiment of the present invention.

Figure 22:
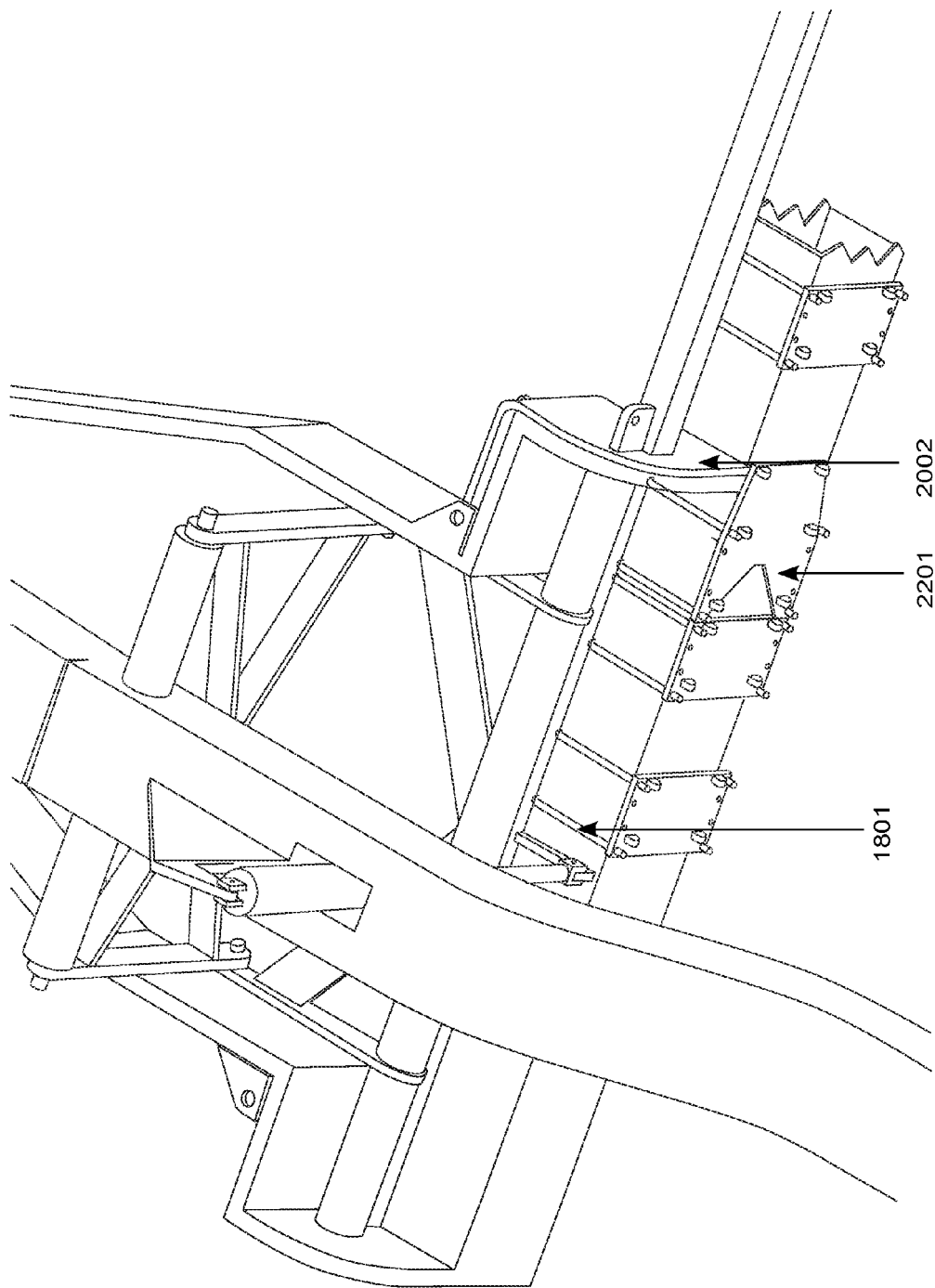
FIG. 22 is a top perspective illustration of a plurality of 20 inch rows of the preferred embodiment of the present invention.
Figure 23:
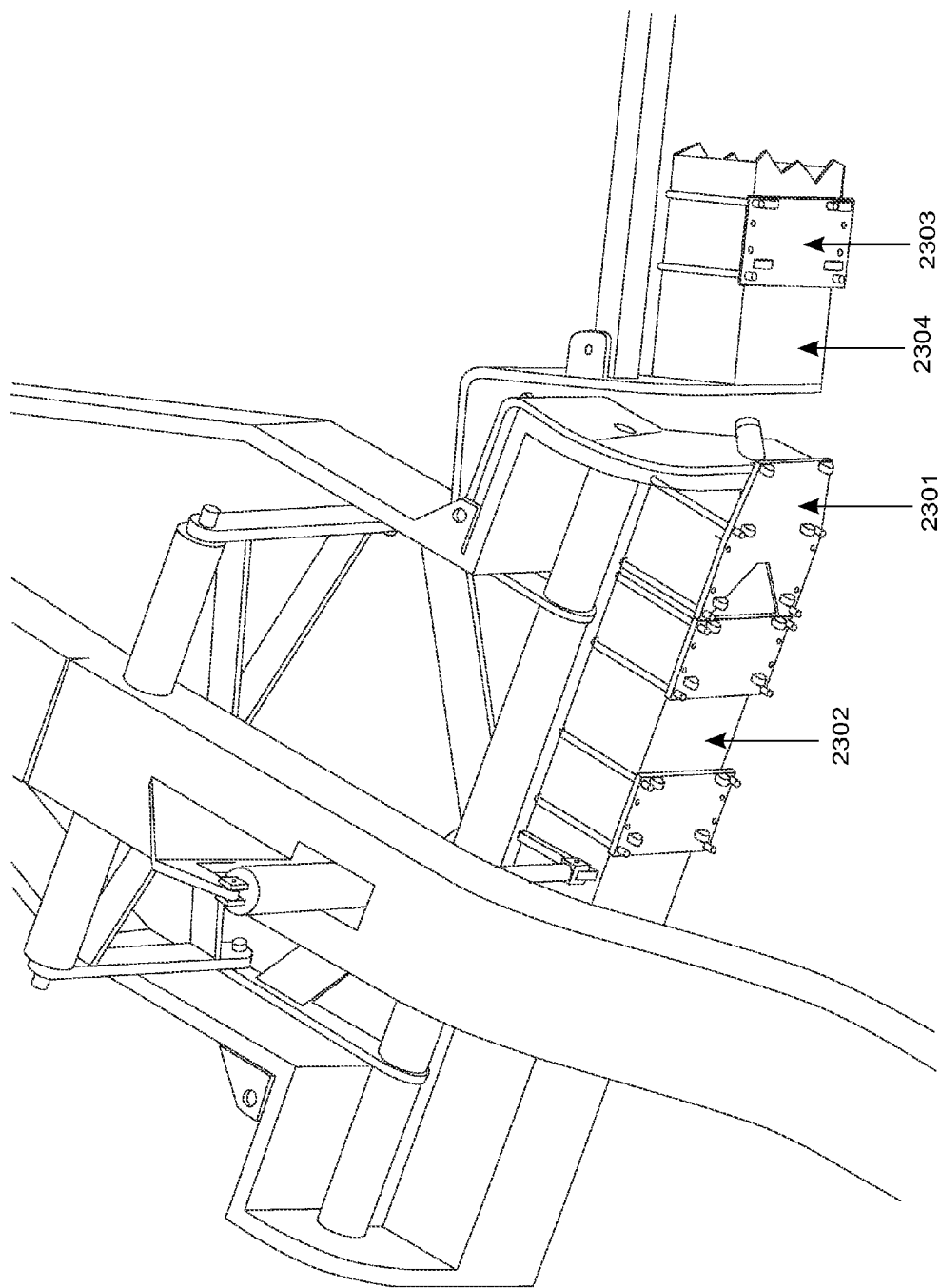
FIG. 23 is a top perspective illustration of a 20 inch row fold-up of the preferred embodiment of the present invention.

In reference to FIG. 22 and FIG. 23, the preferred embodiment of the present invention comprises the following features of a plurality of 20 inch rows: the offset adapter 2301 is needed at the fold-up joint 2002. With the purpose of no structural interference, a rear mounted row unit, attached to adapter 2301 at the joint, must clamp to inner portion of toolbar 2302. The adjacent outer, rear mounted row unit 2303 must clamp to the outer portion of the toolbar 2304.

Figure 24:
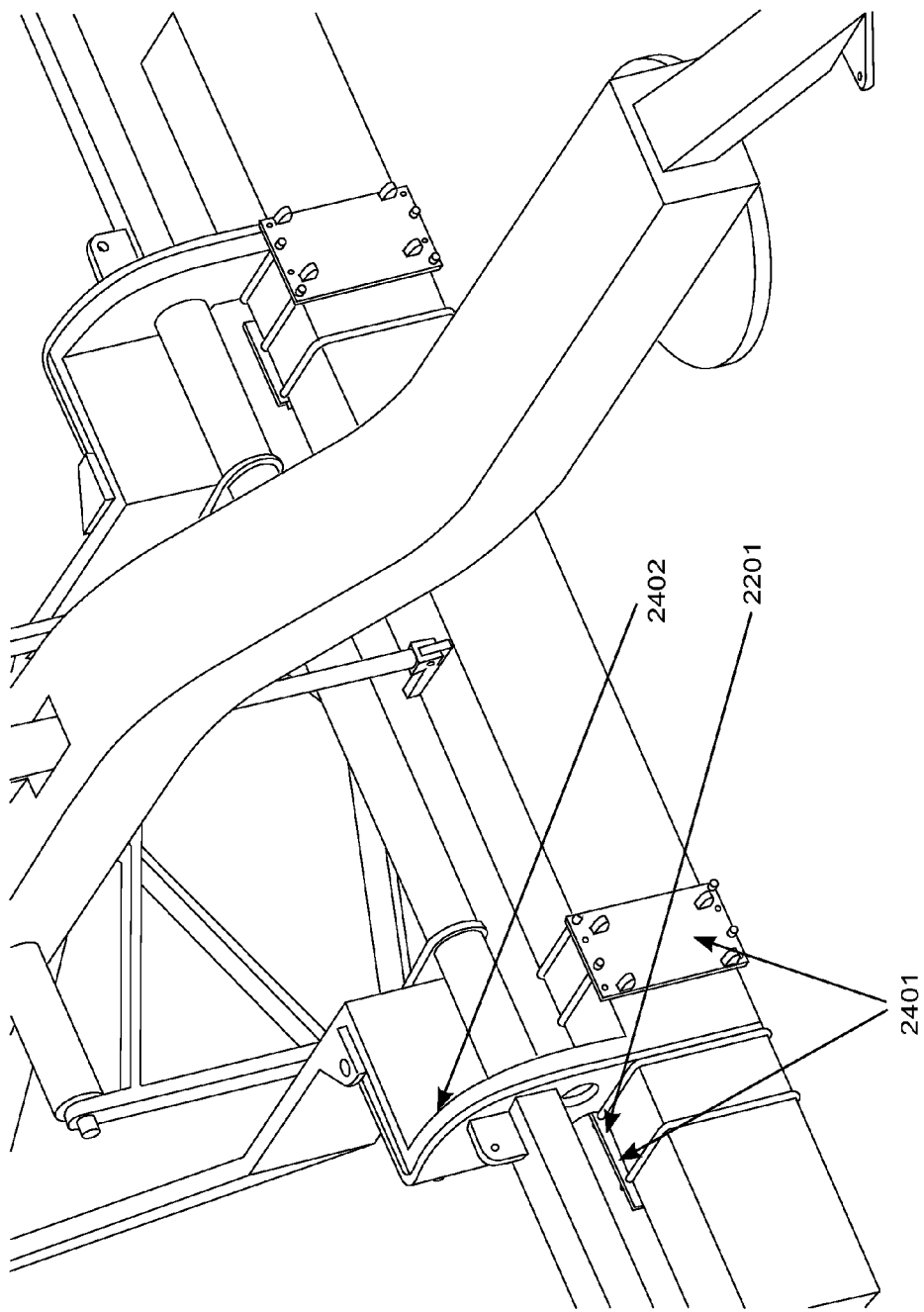
FIG. 24 is a top perspective illustration of a plurality of 30 inch twin rows spaced 8 inches of the preferred embodiment of the present invention.

In reference to FIG. 24, the preferred embodiment of the present invention comprises the following features of a plurality of 30 inch twin rows spaced 8 inches: 1) a pair of row units 2401 would mount at the fold-up joint; 2) the left side joint illustrated, 2402 needs an offset adapter 2201 mounted in front and attached to outer section of the toolbar.

Figure 25:
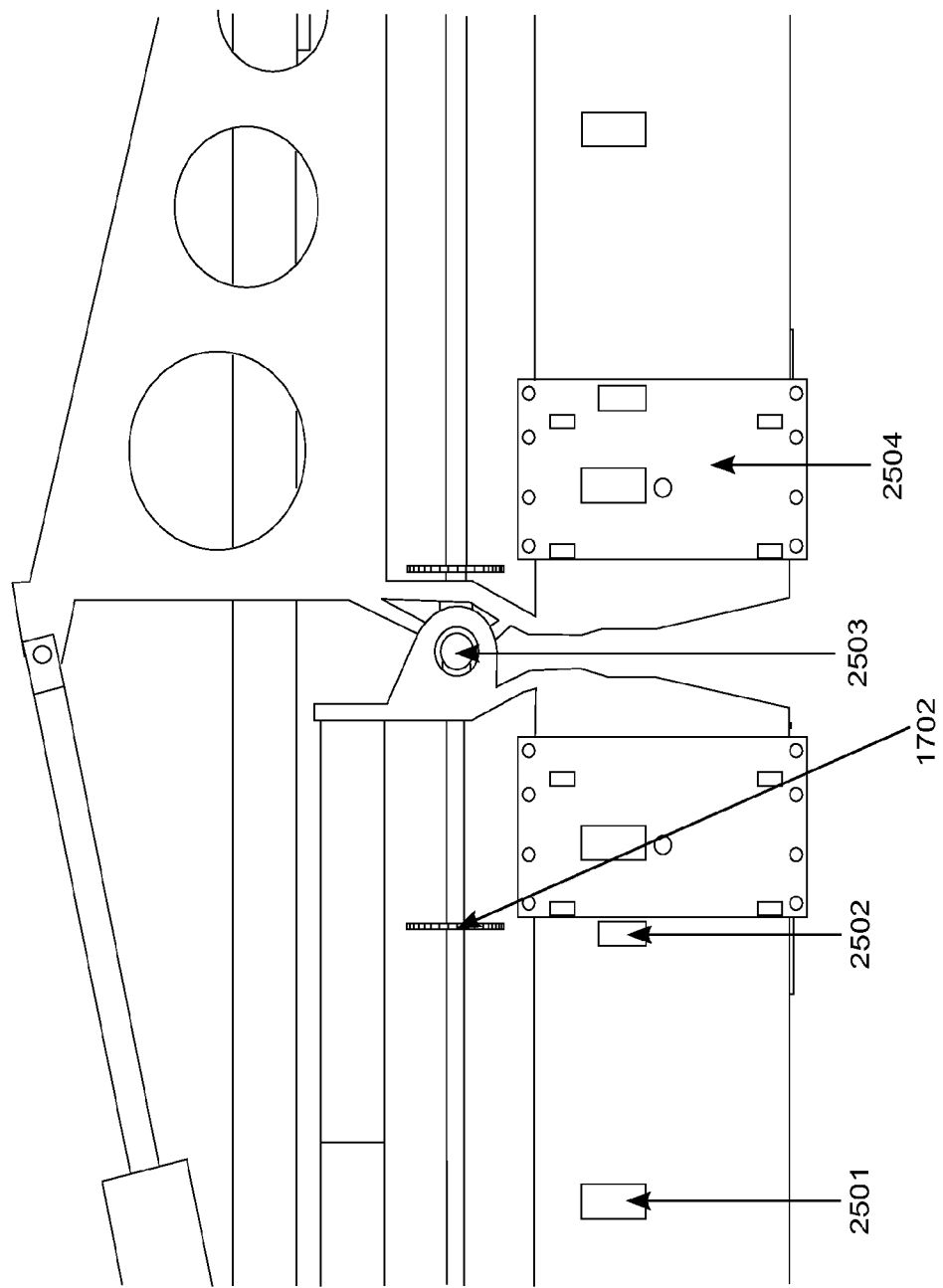
FIG. 25 is a rear perspective illustration of a 20 inch (or 30 inch) row spacing at wing pivot of the preferred embodiment of the present invention.

In reference to FIG. 25, the preferred embodiment of the present invention comprises the following features of a 20 inch row spacing at the wing pivot: 1) the large posts 2501 represent 20 inch row spacing; 2) the small posts 2502 represent 30 inch row spacing; 3) 20 and 30 inch row spacing are symmetrical at center and at increments of 120 inch gage; 4) wing pivot 2503 is shown at 240 inch gage; 5) adapter plates for 20 inch spacing 2504 are shown; 6) 30 inch and 30 inch twin 8s requires no special adapter plates; 7) chain drives 1702 for 30 inch and 30 inch twin 8s do not interfere with pivot 2503 structure. Regarding a 30 inch split row unit (not shown) at wing pivot: 1) an offset adapter plate (not shown) would be used to mount the split row unit on the front side of the toolbar; 2) it has no problem with the chain drive 1702 as long as the offset adapter plate and the chain drive are mounted on the same side of the wing pivot; 3) the wing pivot 2503 being located at 240 inch gage.

Figure 26:
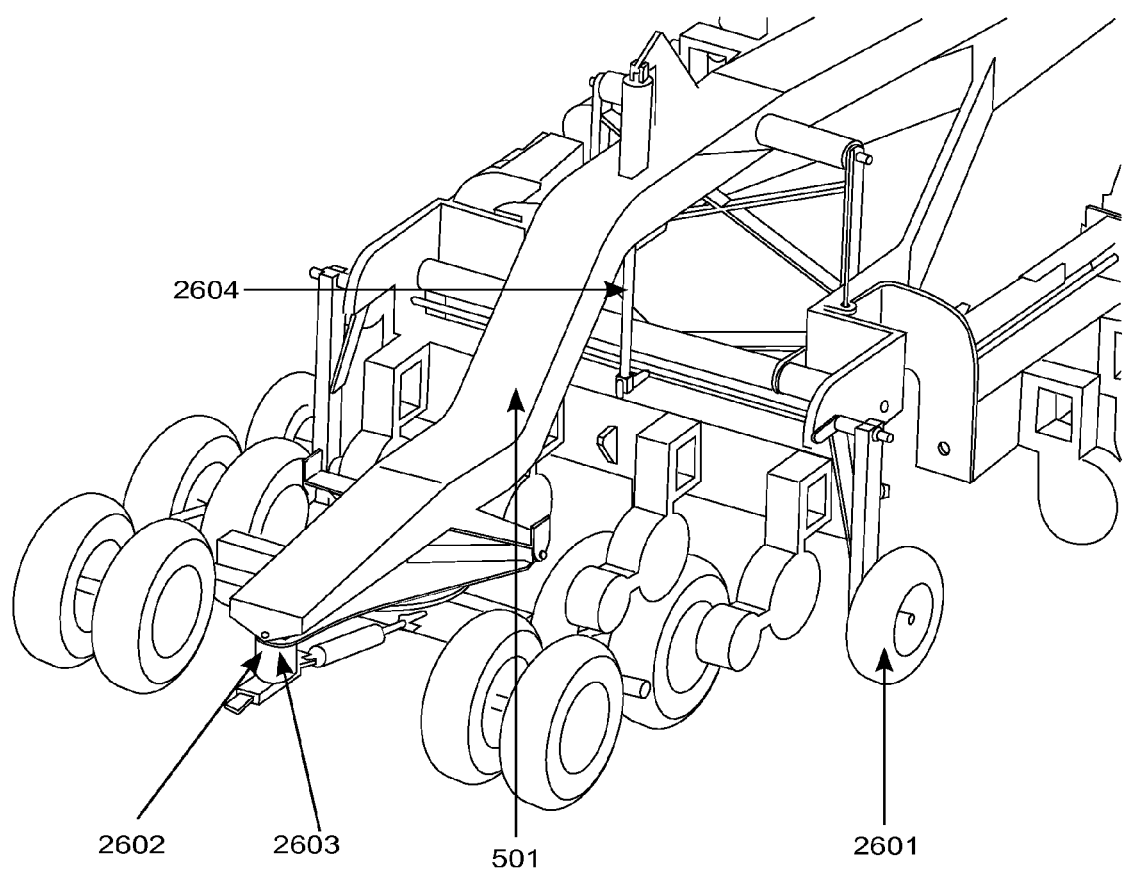
FIG. 26 is a rear perspective illustration of the preferred embodiment of the present invention without an undercarriage.
Figure 27:
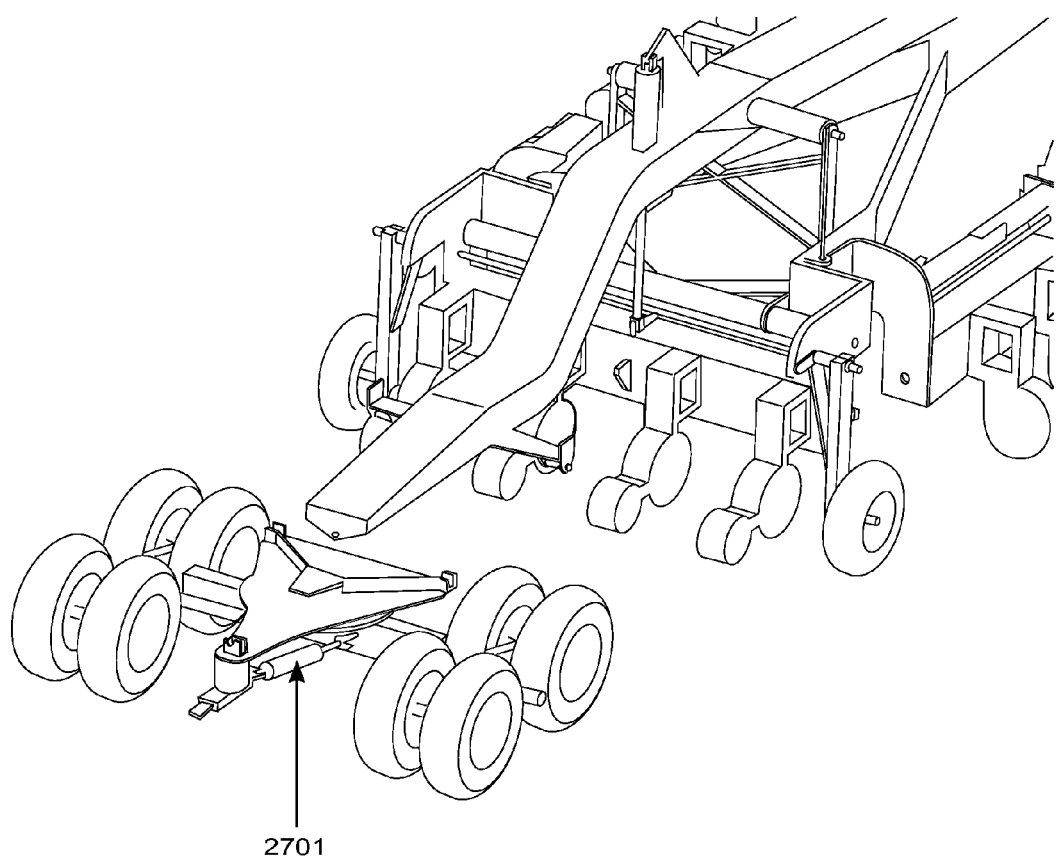
FIG. 27 is an alternative rear perspective illustration of the preferred embodiment of the present invention without the undercarriage.

In reference to FIG. 26 and FIG. 27, an embodiment of the present invention comprises the following features in the situation of disassembling an undercarriage.

Step 1: storage wheel assemblies 2601 are positioned in their down position in preparation to remove the undercarriage;

Step 2: the main frame 501 is unlatched from the undercarriage and steering-function, inner connecting hydraulic couplers (not shown) and electrical components (not shown) are disconnected;

Step 3: the toolbar lift cylinder 2604 extends causing load to be applied to the storage wheels and the load removed from the undercarriage;

Step 4: the lift cylinder continues to extend lifting the main frame off the undercarriage;

Step 5: the tractor moves the implement forward separating the undercarriage from the remainder of the implement; and The undercarriage, with its steering mechanism 2701, is available for a different row-producing implement.

The present invention solves 11 problems encountered with current large row-producing implements:

1. Not being able to precisely follow the path of a previous operation with ease
2. Restricted options regarding row spacing and undercarriage designs
3. Excessive energy needed to raise and lower heavy material in the containers
4. Excessive field rutting caused by the undercarriage's wheels
5. Excessive drawbar pull associated with wheel indentation into the soil
6. Excessive probability of plugging the row unit's material injectors
7. Excessive complexity needed to apply proper down force on the row units
8. Not being able to precisely control the prescribed path of the row units
9. Excessive soil compaction resulting in yield loss
10. Not being able to tow equipment behind a planter configuration
11. Not being able to use portions of expensive implement for both fall and spring operations The following explains how the preferred embodiment of the present invention solves the 11 problems above:

1. Not being Able to Precisely Following the Narrow Strip-Tilled Row with Subsequent Operations:

Precisely following the narrow strip is accomplished by first recording the precise location of rows into a computer's database. It is often desirable to locate the new tilled strip centered between rows of plants created the previous year. Therefore, the location of the rows of the previous year needs to have been accurately defined during that operation the previous year. If the present invention was used to make the previous year's rows, the accuracy of the location of the previous rows is well defined. The present invention reduces the compounding of location errors with each subsequent row-producing operation. Errors include any of the inserted materials not being centered on the tilled strip or the tilled strip not being centered between the previous year's rows of plants.

The rear steer feature allows for an automatic and rapid correction of the lateral location of the row units because the implement's undercarriage with steering capability is close behind the row units. Typical current towed row-producing implements time-lag the tractor's lateral correction because of a long tongue.

For current methods, the tractor's lateral location goes into the computer database. Compensation for the long tongue in a radius-changing situation is difficult. Therefore, this lag constitutes additional, lateral, row location error getting recorded into the computer's database.

For this combination of components and features forming the invention, the data from the rear GPS sensor, located fore aft directly above the row-producing mechanism of the row units, goes into the database. This row location data is more accurate than data from the tractor-mounted GPS sensor.

It is general knowledge that for a towed row-producing implement, needing a long tongue, that the tractor's radius of travel is different that the row unit's radius of travel. It is also general knowledge that the radius of travel, being formed for the first time or already in the database, may be continuously varying. The necessary long tongue of the row-producing implement makes it difficult to create software that can do the math that adequately deals with the lag caused by the long tongue and continuous variations of radii.

To help solve difficulties described above, the present invention locates an auto-steered undercarriage immediately behind the row units. This auto-steered undercarriage is a component and part of a closed loop sub-system that includes a steer angle sensor. This allows two improvements over conventional row-producing methods and implements. First, the row units are leading the main lateral position-correcting mechanism rather than lagging it. Second, the "tongue length" between the row units and the steerable undercarriage is short. This makes the software math simpler to input the correct rear steering amount needed to move the row units to their proper lateral location. This also causes the corrective reaction time to be very short. Therefore compared to conventional methods the present invention greatly reduced the compounding of lateral location errors associated with subsequent row-producing or row-inserting operations.

Another angle sensor is located on the implement's 2-point hitch that defines the angle of the tractor relative to the implement. If the tractor is auto steered, the two angle sensors and the known curvature, if any, of the actual or prescribed rows provides sufficient information to initiate any follow up steering corrections to the tractor's lateral location and prevent an ongoing condition known as crab steered.

Short-term, low-angle crab steer may be beneficial in making rapid corrections to lateral locations. However, crab steering causes an undesirable lateral skid at the row units that is proportional to the angle of the crab steer. Therefore, crab steer must be and can be properly managed.

If the GPS provides assisted steering to the operator, as opposed to auto steer, any necessary steering correction of the tractor is indicated on a monitor typical for assisted steering.

To be user friendly, it is preferred that the rear steering of the row-producing implement be auto steer using a closed loop control sub-system and a GPS sensor located at the row units.

Typically, the individual drawbar force needed to tow each row unit is slightly different because ground conditions can vary from side to side for the implement. Undesirable depth variations can occur for each row unit even with individual depth control on each row unit. These can cause an unbalanced moment creating a force on the implement in the lateral direction. Typically, the tires and other elements must counteract this lateral force. Without rear steer, this requires that the implement go into a lateral skid sufficient to counteract the unbalanced lateral force. Lateral skid causes row location error if the GPS sensor is located on the tractor.

2. Restricted Options Regarding Row Spacing and Undercarriage Designs that can Improve Yields and Make the Row-Producing Implement More Universal:

Generally speaking, individual plants need their own space to grow. Some plant varieties are more susceptible to crowding than other varieties. Crowding can cause the roots to compete for water and nutrients. Crowding can cause leaves to compete for sunlight and permits some sunlight to hit the ground and not be useful to the plant's leaves. Sunlight hitting the ground accelerates the evaporation of needed moisture. Crowding the desired plants together can allow more space, moisture, and sunlight for competing weeds. Profit is likely to suffer.

Current row-producing implement designs restrict options for row spacing namely because undercarriage components use space between some of the row units. Current row-producing implement designs often need a mixture of row spacing but that creates problems regarding harvest machines, fertilizer, applicators, etc.

Row units used for planting seeds are typically suitable to plant a variety of different seed types such as corn, soybeans, sorghum, etc. A current trend is to plant soybeans in rows that are half the width of corn's rows. Universal planters that can do this are often referred to as split-row planters. The location of current planter undercarriages complicates the split-row feature. The present invention relocates the planter's undercarriage and allows more options for uniform row spacing and also for more ideal split-row planting.

It is somewhat typical to plant 15 inch row soybeans into previous year 30-inch cornrows still having short stubs of the old corn plant. This works best if two 15-inch rows are positioned centrally between two old 30-inch cornrows. This allows the planting units to not run on the short stubs of the old corn plants that create depth problems and covering problems. This method preferably puts a row of soybeans only 7.5 inches to each side of the old 30-inch cornrow. Location precision of both the old cornrows and the new soybean rows is important for maximizing profits. The present invention greatly aids in producing these required precisions.

The present invention also gives the farmer an additional option as to how to create what is called split rows. The lateral precision of the present invention allows for a process called double planting where two trips over the same area are made with the planter. The negatives of doing two trips need to be weighed against the positives and negatives of additional row units needed on the planter's tool bar.

3. Excessive Field Rutting Caused by the Undercarriage's Wheels that can Affect Input Costs and Timeliness of Planting:

The more ideal condition is for the surface of the soil to remain smooth and have just enough residues to prevent water and wind erosion.

Indirect, negative effects of soil compaction, caused by heavy row-producing implements and other equipment, include the escape of valuable water. It is much preferred that water applied to the soil move downward into the subsoil and topsoil: being stored for plants to use during dry conditions. Water forced to run off has a lot of detrimental effects. These detrimental effects include erosion, flooding, river silting, etc. The present invention has both direct and indirect benefits in these regards.

Heavy implements that have a limited number of tires for space reasons can cause compaction and rutting. Re-smoothing the soil's surface and removing compaction is generally a multi-step, costly process. Many tillage processes, that remove compaction, wheel indents, ruts, etc., usually leave the soil's surface too rough to plant.

Additional processes then become necessary to finish re-smoothing the soil's surface to an acceptable planting condition. These processes made necessary by the use of heavy equipment add to input costs, tend to bury protective residues, and can affect timeliness of planting.

The strip tilling methods that are gaining favor with both farmer and Government does not work well in rutted soils. Typically, conventional row-producing implements have the rut-causing tires centered between some of the rows being produced. In the following season, these ruts are located exactly where the tilled strips need to be. Strip tilling does not fill this type of rut. Any seed placed in a rut is generally not profitable because the plant may never emerge or it may be stunted.

An undercarriage on tracks is preferred for not producing ruts thus leaving the ground smooth. Also, weight sharing among many tires causes shallower ruts. The present invention, having the undercarriage completely behind the row units allows for options that greatly reduces rutting and soil compaction.

4. Excessive Drawbar Pull Associated with Wheel Indentation into the Soil:

It is common to encounter soft areas in the field being worked. Excess wetness in low areas, including ditches and areas that puddle often, causes implements to sink deeply into the soil at these locations. The implement may pull several times harder when sunk deeply in the soft area. For this reason, the tractor that is selected to pull the row-producing implement tends to be larger than otherwise needed. The larger the tractor, the more costly the field operation, the more the soil gets compacted, and the deeper the tractor's ruts into the soil's surface.

The preferred situation is for both the tractor and the implement to have tracks for their undercarriage. Current row-producing implement configurations make it difficult to install tracks on the implement. The present invention, having the implement's undercarriage moved back away from the row units, allows more freedom to select a proper track configuration having low compaction, good flotation in soft ground, and require less drawbar pull.

Currently, there are tractors available that offer tracks with a variety of options. The present invention provides two desirable companion implements that can offer tracks with a variety of options.

5. Excessive Energy Needed to Raise and Lower Heavy Supply Containers:

Current row-producing implements use hydraulic energy to raise and lower most of the entire implement's mechanism, including the materials in the containers. Those skilled in the art understand that row-producing implements need to rise only the row units for turning around at the ends of the field and that current implement configurations require that most all of the mass be raised several inches higher than the row units in order to raise the row units an adequate amount. This stems from the row units being necessarily able to independently move up and down relative to the tool bar.

Row-producing implements that distribute material into the row prefer to use hydraulic energy for the function rather than be ground driven. This is mainly because variable rate distribution is becoming more necessary in order to control rising material costs and to maximize yields. The material distribution function can also consume a lot of hydraulic energy. Any opportunities to minimize the amount of hydraulic energy can contribute to being able to use a smaller tractor.

Large containers have certain benefits. As mentioned above, heavy loads are a trade off.

The benefits of large containers include:

a. Less time is spent with the implement stopped for filling containers. The filling process requires time to move the supply vehicles into place after the implement has stopped. Also, time is required to open and close container covers each time the filling process happens. Also, time is required to position material transfer augers and conveyors each time the filling process happens.

b. Often, other helpers involved in the filling of the planter's containers, for example, are assigned to do other tasks while the planter is planting such as seedbed preparation nearby. Larger containers require less interruptions and lost production of said helper and of the other tasks of the helper.

Overall efficiency of people and machinery is improved by having larger containers on the planter. Stopped time can cost up to $400+ per hour in terms of lost yields for example.

For the present invention, the preferred location of all the containers for seed and other materials is directly over the undercarriage component located behind the row units. This contributes to reducing the weight and beam strength of the central frame structure and the center section of the tool bar.

6. Excessive Probability of Plugging the Row Units:

For the present invention, the central containers remain in a low position at all times and have good access from several sides. Having to handle and elevate bags of material by hand, as is often the case, is incentive to lower the implement for refilling. In order to lower the implement's containers for refilling, the practice of lowering the current implement's toolbar and row units onto the ground while stopped for refilling the containers runs a risk of plugging the row unit's drop tubes and otherwise affecting the proper distribution of materials. The present invention better allows the desirable situation where the row units remain raised during refilling operations.

Also, the row units are easier to inspect and adjust while in the raised position. If the containers are refilled using mechanical means and using a second person supplying the materials, the implement's operator may have time to do inspections and adjustments and reap benefits from timely inspections and adjustments.

7. Excessive Component Size Needed to Apply Proper Down Force on the Row Units:

For row-producing implements that contain a large number of row units, wings that pivot up and down are generally employed. For 30" row spacing for example, implements with more than 8 row units tend to have wings. The wings need to contain extra weight to provide the maximum push down force required by the row units attached to the wings. A gage wheel at the outer end of each wing carries any extra weight not being used by the row units at the moment.

As the implement experiences soft soil, less push down force applied to the row units is needed from the wing's tool bar. Some state of the art technologies apply a lift force at each row unit in certain soft soil conditions. This extra weight plus any lift force adds to the weight is carried by the tool bar. This in turn results in the wing's gage wheel carrying additional weight. This in turn tends to cause rutting in the soft soil that is causing the need for a lifting force. Thus, soft soils tend to become rutted. The present invention included a means to keep the wing's gage wheel lightly loaded at all times during fieldwork.

8. Excessive Soil Compaction Resulting in Yield Losses:

Reduced soil compaction is one of the more significant benefits of the present invention. Soil compaction tends to reduce crop yields and also cause other problems. During field operation, the current large row-producing implements use tires for wheels to carry any weight in excess of that carried by the row units. The amount of weight carried by the row units depends on several factors. These factors include whether the row unit is a tillage unit, a fertilizer placement unit, or a seed-planting unit.

For planting seeds, those skilled in the art of optimizing the environment around the newly planted seeds understand that it is preferred to not carry weight on the row units in excess of that needed to provide proper seed depth. If the row-producing implement is equipped for planting seeds, the planter's transport wheels and the tractor drawbar carry the remainder of the weight. The increase in weight of the implement's components coupled with operational advantages of carrying larger amounts of supplies have increased the amount of compaction under the transport wheels; reducing crop yields. The present invention helps to minimize yield loss due to compaction.

For planting seeds, currently the planter's transport wheels are placed in about the same fore-aft location as the disc openers on the row units. This wheel position allows the planter to travel in an arc without the disc openers being forced to have an undesirable component of lateral movement. A second purpose of this fore-aft wheel position enables the planter to travel over crowns and thru recessed areas without the row units needing a lot of flexibility to travel vertically relative to the tool bar.

Currently, the implement's transport wheels do not share a wheel track with other wheels on the implement. Those skilled in the art of understanding wheel compaction understand that if two wheels are in a tandem configuration and sharing the load equally, the trailing wheel only does about 20% as much compaction damage as the leading wheel. The present invention prefers using tracks. As an option to tracks, several sets of transport tires can be put in trailing configurations thus sharing wheel tracks. One group supports the left side and the other group supports the right side of the row-producing implement.

A preferred aspect of the present invention is to put a rubber belt around each set of wheels in trailing configuration. This is called a track assembly. Using track assemblies is the ultimate way to reduce compaction. A track assembly generally uses larger wheels at each end of the track assembly and uses one or more smaller wheels between the two larger wheels. The larger wheels are generally referred to as idlers and the smaller wheels are referred to as mid-rollers.

10. Not being Able to Tow Equipment Behind a Planter Configuration:

Some farmers farm land parcels that are separated by large distances. Thus, multiple units of equipment need to travel large distances over public roads. For examples service tenders and seed tenders. Conventional planters typically do not have trailer hitches for reasons including, but not limited to, hitch structure interferes with row units, hitch structure height moves up and down as the row units are moved up and down, the hitch moves up and down a greater distance that the planter row unit, two wheel trailers or tenders typically need a near constant tongue height, etc.

11. Not being Able to Use Portions of an Expensive Implement for Both Fall and Spring Operations:

During fall tillage, the planter for most Ag seeds sets idle. During the spring planting season, current strip till and fertilizer placement equipment tends to sets idle.

The configuration of components used to create the present invention lends itself to conveniently separating major component subassemblies. It is a financial advantage to find multiple uses for expensive implement components.

As a general rule having exceptions, a strip till row unit pulls approximately two times harder than a planting row unit. Nitrogen fertilizer is usually applied towing a pressurized tank for the supply. Typically, strip tillage may be done using the available planter tractor and about a third to half the number of row units as the planter uses.

As a general rule, a large planter's tool bar folds forward. Strip till and fertilizer placing tool bars are narrower and have wings that fold upward. For this integrated system, commonality includes the undercarriage, the rear steering mechanism, the front 2-point hitch assembly, and some of the control system.

The details of the present invention show the undercarriage with the rear steering mechanism to be attached to the main frame using 3-point mounting and quick disconnect components. After removing a pin at each of the three mounting points, disconnecting two steering hose quick couplers, and an electrical connector, the main frame can be lifted up leaving the undercarriage with it steering mechanism as a loose assembly.

Before lifting the main frame and with the set of row units raised, left side and right side wheel components are attached to the toolbar: one tire each side. The purpose of the two wheel components is to make the remaining portion of the implement mobile without its undercarriage.

To lift the main frame up off the undercarriage component, the toolbar's lift and lower cylinder can be used. Pushing down on the toolbar lifts the main frame. After lifting, all of its other components can be pulled forward away from the undercarriage assembly.

The other set of row units can now be attached to the undercarriage with its steering mechanism. The other set of row unit having a toolbar, mainframe, etc also needs two wheel components for mobility until the undercarriage is attached.

The present invention is accomplished by a unique combination of components that form mechanisms; many that are understood by those skilled in the art. Some explanations are in order.

The present invention requires the use of two additional control sub-systems:

a. There is needed an active toolbar height control sub-system similar to header height control systems on combines.

b. An active steering sub-system for the undercarriage.

Both added sub-systems have to do with the undercarriage not being in the same fore-aft position as the toolbar. It is normal for ground contours to have both raised areas and recessed areas. Because the row units reach said areas before the undercarriage does, the height of the tool bar needs to be adjusted in height relative to the undercarriage. Harvest vehicles, such as combines, have a similar situation because the headers operate in front of the combine's undercarriage.

Typically, height control systems have one or more components that operate in contact with the ground. These components sense the surface of the ground. For planting operations, wheels called gage wheels roll on the surface of the ground. Typically a parallelogram linkage connects each row unit's other components to the tool bar. This linkage allows each row unit to have a limited stroke to move up and down relative to the tool bar.

Also for planting operations, each row unit has its own spring connected between the tool bar and said row unit that causes weight to be transferred from the tool bar onto each row unit. The spring's downward force is needed to supplement the natural weight of the row unit because often the natural weight of the row unit is not sufficient to: 1. Force the disc openers into the soil the required depth; and 2. provide sufficient weight on the seed covering wheels. The harder the soil the more weight is needed to force the disc openers into the soil.

The soil can vary in hardness from area to area. Older planter concepts applied enough down force for all soil conditions and rely on the gage wheels to carry any excess down force encountered in softer soils. It has been shown that excess weight carried by the gage wheels compact the soil excessively around the seed. This has caused newer planter concepts to not use simple coil springs to supplement down force but rather to use variable force springs such as air springs. This requires an onboard air pressure supply, load sensors on the row unit's gage wheels, and a control system.

The strip till operation and the fertilizer placement operation also require some means of controlling depth. Some type of gage wheel is required. Many of the features, used on the planting row units, are needed for these operations.

The integrated system of this invention, functioning as two implements with mainly a shared undercarriage component and some shared control components, is able to carry out various types of work. In the fall, the integrated system can prepare the parallel, fertilized, tilled strips in a field that would serve as the seedbed for agricultural plants. In the spring, the integrated system can plant seeds in a row centered on the tilled strips.

Although the two row-producing implements may take different assembling forms, there are a few basic components that are critical for the disclosed implements to appropriately function with the new and beneficial features. They include similar main frames with an elevated, arched configuration; a shared undercarriage component comprising tracks or wheels being located at the rear of the implement in the present invention; the undercarriage component also having its own steering mechanism; location of the supplies carried being directly above the undercarriage component; mounting components for connecting the tool bar to the main frame; its toolbar having unlimited options for spacing the row units. In addition, it also comprises angled tow bars that helps to tow the outer ends of the tool bar; and in these when the implement is driven on the road, to fold up the tool bar for easy transportation. A few control components are also needed for the undercarriage's steering function, for adjusting the height of the tool bar, and for the load on the tool bar. Its tool bar has various options for spacing the row units. With different purpose, the undercarriage component can be disconnected conveniently.

Although the invention has been explained in relation to its preferred embodiment, it is to be understood that many other possible modifications and variations can be made without departing from the spirit and scope of the invention as herein described.

What is claimed is:

1. An integrated system for producing rows and planting seeds, comprising
   a central frame assembly;
   an undercarriage assembly;
   a toolbar assembly;
   a tow bar assembly;
   row unit assemblies;
   wing wheels;
   a front hitch assembly;
   controlling systems;
   a GPS system;
   said central frame assembly having an elevated arched configuration; and
   said front hitch assembly being attached to a tractor.

2. The integrated system for producing rows and planting seeds of claim 1, comprising
   said undercarriage assembly being located at one side of said integrated system;
   said side with the undercarriage assembly being opposite to a side that attaches to the tractor;
   said undercarriage assembly comprising a rear active steering system and tracks or wheels.

3. The integrated system for producing rows and planting seeds of claim 2, comprising
   said rear active steering system comprising a steer angle sensor;
   said rear active steering system being a closed loop continuous feedback system;
   said rear active steering system allowing for adjusting lateral location of said row units and preventing lateral skid of said row units; and
   said rear active steering system keeping the row to be produced in a precisely located lateral direction.

4. The integrated system for producing rows and planting seeds of claim 1, comprising
   said toolbar providing a pivot for folding up and unfolding said system;
   said toolbar being restricted laterally by a link bracing; and
   said toolbar being restricted from tipping to one side by a torque tube.

5. The integrated system for producing rows and planting seeds of claim 1, comprising
   said tow bar functioning to tow outer ends of said toolbar;
   said tow bar allowing wings of said toolbar moving up and down;
   said tow bar allowing wings of said toolbar folding up;
   said tow bar comprising toolbar attachments and power jack-knifes;
   said power jack-knifes comprising a four-bar linkage; and
   said power jack-knifes omitting a need for a telescoping tongue assembly.

6. The integrated system for producing rows and planting seeds of claim 1, comprising
   an axle line of said row units being intersecting to an axle line of said undercarriage assembly and said tractor.

7. The integrated system for producing rows and planting seeds of claim 1, comprising
   said wing wheels comprising a structure with load cell in wing wheel spindle;
   said wing wheels supporting the weight of ends of said toolbar;
   said wing wheels functioning to raise and lower the ends of said toolbar; and
   said wing wheels being retracted when said implement is on a public road.

8. The integrated system for producing rows and planting seeds of claim 1, comprising
an active toolbar height controlling system;
said active toolbar height controlling system adjusting the height of said toolbar to a correct height; and
said active toolbar height controlling system having components sensing a ground surface.

9. The integrated system for producing rows and planting seeds of claim 1, comprising
said GPS system being directly above the center of said row units; and
said GPS system functioning to control said rear active steering system.

10. The integrated system for producing rows and planting seeds of claim 1, comprising
said undercarriage assembly being attached to said central frame assembly with one or more quick disconnecting points, preferably 3 points;
said quick disconnect points each having an unlatchable means; and
said undercarriage assembly being disconnected from said system when needed.

11. The integrated system for producing rows and planting seeds of claim 1, comprising
containers for seeds and other materials; and
said containers being weight-centered directly above said undercarriage assembly.

12. The integrated system for producing rows and planting seeds of claim 1, comprising
rubber belt track assemblies or tires; and
said rubber belt track assemblies being large enough to reduce compactions to an acceptable level; and
said tires reducing compactions, and not making ruts.

13. The integrated system for producing rows and planting seeds of claim 1, comprising
said integrated system being assembled and modified as a strip tiller to prepare parallel, fertilized and tilled strips in a field, wherein said strips serve as seedbeds for agricultural plants; and
said integrated system being assembled and modified as a planter to precisely follow the location of said tilled strips to place seeds and other supplies.

* * * * *